United States Patent
Beckman et al.

(10) Patent No.: US 9,277,763 B2
(45) Date of Patent: Mar. 8, 2016

(54) BIOPRESERVATION METHODS FOR BEVERAGES AND OTHER FOODS

(71) Applicant: Starbucks Corporation, Seattle, WA (US)

(72) Inventors: Lisa L. Beckman, Kent, WA (US);
Michael A. Bauman, Seattle, WA (US);
Curtis R. Moon, Federal Way, WA (US);
Mark B. Satterfield, Yucaipa, CA (US);
Marcia K. Walker, Murrieta, CA (US);
Dennis A. Lonergan, Medina, MN (US)

(73) Assignee: Starbucks Corporation, Seattle, WA (US)

( * ) Notice: Subject to any disclaimer, the term of this patent is extended or adjusted under 35 U.S.C. 154(b) by 0 days.

(21) Appl. No.: 14/312,544

(22) Filed: Jun. 23, 2014

(65) Prior Publication Data
US 2015/0004293 A1    Jan. 1, 2015

Related U.S. Application Data

(60) Provisional application No. 61/840,332, filed on Jun. 27, 2013.

(51) Int. Cl.
*A23L 3/015*    (2006.01)
*A23L 2/44*    (2006.01)
*A23L 2/02*    (2006.01)
(Continued)

(52) U.S. Cl.
CPC ............... *A23L 2/44* (2013.01); *A23L 1/3014* (2013.01); *A23L 2/02* (2013.01); *A23L 3/0155* (2013.01); *A23L 3/3571* (2013.01); *A23Y 2220/17* (2013.01); *A23Y 2220/73* (2013.01)

(58) Field of Classification Search
CPC ..... A23L 1/3014; A23L 3/0155; A23L 3/3571; A23Y 2220/17
USPC ........ 426/42, 52, 615, 616, 321, 468, 335, 61
See application file for complete search history.

(56) References Cited

U.S. PATENT DOCUMENTS

| 3,794,739 A | 2/1974 | Lee et al. |
| 3,899,594 A | 8/1975 | Nickerson et al. |
| 4,168,328 A | 9/1979 | Cheney et al. |

(Continued)

FOREIGN PATENT DOCUMENTS

| EP | 162 805 | 8/1987 |
| EP | 092 183 | 1/1989 |

(Continued)

OTHER PUBLICATIONS

International Search Report and Written Opinion for PCT/US2014/043725, dated Oct. 15, 2014.

(Continued)

*Primary Examiner* — Helen F Heggestad
(74) *Attorney, Agent, or Firm* — Knobbe Martens Olson & Bear, LLP

(57) ABSTRACT

Several embodiments of the present invention relate generally to the use of non-pathogenic microorganisms to prevent the growth and/or activity of pathogenic microorganisms in food products. More specifically, several embodiments relate to manipulation of the pH of low acid foods by non-pathogenic microorganisms to generate a local environment that is adverse to pathogenic microorganisms.

17 Claims, 9 Drawing Sheets

(51) Int. Cl.
*A23L 3/3571* (2006.01)
*A23L 1/30* (2006.01)

(56) References Cited

U.S. PATENT DOCUMENTS

| | | | |
|---|---|---|---|
| 4,276,311 A | 6/1981 | Burrows et al. |
| 4,477,471 A | 10/1984 | Gonzalez |
| 4,492,338 A | 1/1985 | Marelli |
| 4,599,313 A | 7/1986 | Gonzalez |
| 4,740,593 A | 4/1988 | Gonzalez et al. |
| 4,764,371 A | 8/1988 | Pusey et al. |
| 4,851,240 A | 7/1989 | Day et al. |
| 4,874,704 A | 10/1989 | Boudreaux et al. |
| 4,886,673 A | 12/1989 | Hammes |
| 4,894,243 A | 1/1990 | Ahrne |
| 4,912,047 A | 3/1990 | Matrozza et al. |
| 4,929,445 A | 5/1990 | Vendenbergh et al. |
| 4,956,177 A | 9/1990 | King et al. |
| 5,006,347 A | 4/1991 | Day et al. |
| 5,026,564 A | 6/1991 | Hayden |
| 5,047,239 A | 9/1991 | Pusey |
| 5,171,591 A | 12/1992 | Whiting |
| 5,186,962 A | 2/1993 | Hutkins et al. |
| 5,202,142 A | 4/1993 | Gresch |
| 5,348,881 A | 9/1994 | Vedamuthu et al. |
| 5,374,433 A | 12/1994 | Bowling et al. |
| 5,378,458 A | 1/1995 | Mayra-Makinen et al. |
| 5,514,391 A | 5/1996 | Bushnell et al. |
| 5,573,800 A | 11/1996 | Wilhoit |
| 5,576,035 A | 11/1996 | Bowling et al. |
| 5,654,020 A | 8/1997 | Sandine et al. |
| 5,750,165 A | 5/1998 | Erway et al. |
| 5,759,843 A | 6/1998 | Sandine et al. |
| 5,763,251 A | 6/1998 | Gasson |
| 5,780,080 A | 7/1998 | Liefert et al. |
| 5,817,357 A | 10/1998 | Vandenbergh et al. |
| 5,837,303 A | 11/1998 | Hayden |
| 5,858,424 A | 1/1999 | Virkki et al. |
| 5,869,038 A | 2/1999 | Leifert et al. |
| 5,869,113 A | 2/1999 | Clayton et al. |
| 5,877,272 A | 3/1999 | Vandenbergh et al. |
| 5,908,646 A | 6/1999 | Mayra-Makinen et al. |
| 5,919,695 A | 7/1999 | Vedamuthu et al. |
| 5,962,288 A | 10/1999 | Aksenov et al. |
| 5,965,414 A | 10/1999 | Vandenbergh et al. |
| 6,039,984 A | 3/2000 | Bowling et al. |
| 6,074,565 A | 6/2000 | Buckner |
| 6,231,908 B1 | 5/2001 | Lelieveld et al. |
| 6,242,017 B1 | 6/2001 | Nauth et al. |
| 6,277,374 B1 | 8/2001 | Vandenbergh et al. |
| 6,322,783 B1 | 11/2001 | Takahashi |
| 6,387,427 B1 | 5/2002 | Rekhif et al. |
| 6,403,082 B1 | 6/2002 | Stiles et al. |
| 6,461,608 B1 | 10/2002 | Averback et al. |
| 6,524,631 B1 | 2/2003 | Dicks |
| 6,534,107 B1 | 3/2003 | Ma et al. |
| 6,562,386 B2 | 5/2003 | Ruan et al. |
| 6,569,474 B2 | 5/2003 | Clayton et al. |
| 6,607,905 B1 | 8/2003 | Luquet |
| 6,613,364 B2 | 9/2003 | Begg et al. |
| 6,689,750 B1 | 2/2004 | Mollet et al. |
| 6,692,779 B2 | 2/2004 | Dominques et al. |
| 6,696,019 B2 | 2/2004 | Laugharn, Jr. et al. |
| 6,699,701 B1 | 3/2004 | Sulakvelidze et al. |
| 6,812,022 B1 | 11/2004 | Aonuma |
| 6,833,150 B1 | 12/2004 | Ross et al. |
| 6,905,716 B2 | 6/2005 | Selmer-Olsen |
| 6,916,647 B1 | 7/2005 | Elsser |
| 6,932,992 B1 | 8/2005 | Ibrahim |
| 6,991,820 B2 | 1/2006 | Ming et al. |
| 7,063,974 B2 | 6/2006 | Bharathi et al. |
| 7,112,323 B2 | 9/2006 | Ibrahim et al. |
| 7,169,415 B2 | 1/2007 | Bowling et al. |
| 7,238,515 B2 | 7/2007 | Berjeaud et al. |
| 7,291,326 B2 | 11/2007 | Ware et al. |
| 7,323,166 B2 | 1/2008 | Brashears et al. |
| 7,328,653 B2 | 2/2008 | Tonello |
| 7,438,901 B2 | 10/2008 | Loessner et al. |
| 7,579,030 B2 | 8/2009 | Domingues et al. |
| 7,585,530 B2 | 9/2009 | Etchells et al. |
| 7,794,999 B2 | 9/2010 | Stiles |
| 7,858,336 B1 | 12/2010 | Garner et al. |
| 7,863,033 B2 | 1/2011 | Hata et al. |
| 7,888,062 B1 | 2/2011 | Garner et al. |
| 7,906,160 B2 | 3/2011 | Sherwood et al. |
| 7,927,639 B2 | 4/2011 | Schwenninger et al. |
| 7,939,119 B2 | 5/2011 | Elsser |
| 7,947,321 B2 | 5/2011 | Brophy et al. |
| 8,029,779 B2 | 10/2011 | Miyamoto et al. |
| 8,092,852 B2 | 1/2012 | Salinas et al. |
| 8,101,220 B2 | 1/2012 | Garwood |
| 2002/0108505 A1 | 8/2002 | Ostermann et al. |
| 2003/0113403 A1 | 6/2003 | Jaeger et al. |
| 2003/0190389 A1 | 10/2003 | Domingues et al. |
| 2003/0203963 A1 | 10/2003 | Elsser et al. |
| 2004/0071842 A1 | 4/2004 | Van Schepdael et al. |
| 2004/0191374 A1 | 9/2004 | Weng et al. |
| 2004/0265289 A1 | 12/2004 | Elsser et al. |
| 2005/0042594 A1 | 2/2005 | Kringelum et al. |
| 2005/0069862 A1 | 3/2005 | Kringelum et al. |
| 2005/0084581 A1 | 4/2005 | Sato |
| 2005/0153033 A1 | 7/2005 | Stiles et al. |
| 2005/0163888 A1 | 7/2005 | Hayashi et al. |
| 2005/0233032 A1 | 10/2005 | Savard et al. |
| 2005/0238631 A1 | 10/2005 | Burwell |
| 2005/0266128 A1 | 12/2005 | Yuan et al. |
| 2006/0153962 A1 | 7/2006 | Carroll et al. |
| 2006/0204618 A1 | 9/2006 | Doumoto et al. |
| 2006/0270019 A1 | 11/2006 | Uehara et al. |
| 2007/0071865 A1 | 3/2007 | Aldred et al. |
| 2007/0231311 A1 | 10/2007 | Kroening et al. |
| 2007/0243295 A1 | 10/2007 | Scully et al. |
| 2007/0275124 A1 | 11/2007 | Kutyev |
| 2008/0026102 A1 | 1/2008 | Terragno et al. |
| 2008/0032030 A1 | 2/2008 | Babaev |
| 2008/0107699 A1 | 5/2008 | Spigelman et al. |
| 2008/0107772 A1 | 5/2008 | Stiles et al. |
| 2008/0311259 A1 | 12/2008 | Singh et al. |
| 2008/0317823 A1* | 12/2008 | Carroll et al. ............. 424/439 |
| 2009/0136624 A1 | 5/2009 | Tanaka et al. |
| 2009/0246336 A1 | 10/2009 | Burnett et al. |
| 2009/0263556 A1 | 10/2009 | Blondeel et al. |
| 2010/0055269 A1 | 3/2010 | Haynes et al. |
| 2010/0086528 A1 | 4/2010 | Olofsson et al. |
| 2010/0086968 A1 | 4/2010 | Stahnke et al. |
| 2011/0028427 A1 | 2/2011 | Mcmanus |
| 2011/0052655 A1 | 3/2011 | Whitekettle et al. |
| 2011/0177198 A1 | 7/2011 | Songisepp et al. |
| 2011/0182862 A1 | 7/2011 | Green et al. |
| 2011/0183052 A1 | 7/2011 | Sherwood et al. |
| 2011/0189147 A1 | 8/2011 | Garner et al. |
| 2012/0003355 A1 | 1/2012 | Bernaert et al. |
| 2012/0034198 A1 | 2/2012 | Garner et al. |
| 2012/0040053 A1 | 2/2012 | Rasholt et al. |
| 2012/0114790 A1 | 5/2012 | Stahnke |
| 2012/0183645 A1 | 7/2012 | Kim et al. |
| 2012/0201795 A1 | 8/2012 | Ware et al. |
| 2012/0207876 A1* | 8/2012 | Lonergan ......................... 426/8 |

FOREIGN PATENT DOCUMENTS

| | | |
|---|---|---|
| EP | 302 300 | 2/1989 |
| EP | 333 056 | 9/1989 |
| EP | 290 295 | 8/1992 |
| EP | 326 062 | 8/1992 |
| EP | 221 499 | 1/1993 |
| EP | 137 869 | 4/1993 |
| EP | 374 823 | 12/1993 |
| EP | 463 284 | 12/1993 |
| EP | 573 768 | 7/1996 |
| EP | 484 991 | 4/1998 |
| EP | 576 780 | 11/1998 |
| EP | 632 693 | 1/1999 |
| EP | 384 319 | 4/1999 |

(56) References Cited

FOREIGN PATENT DOCUMENTS

| | | |
|---|---|---|
| EP | 698 348 | 1/2000 |
| EP | 469 952 | 5/2000 |
| EP | 660 670 | 1/2001 |
| EP | 769 915 | 11/2001 |
| EP | 1 194 525 | 4/2002 |
| EP | 1 338 205 | 8/2003 |
| EP | 510 907 | 8/2003 |
| EP | 1 442 113 | 8/2004 |
| EP | 1 250 050 | 10/2004 |
| EP | 1 171 000 | 11/2004 |
| EP | 677 110 | 12/2004 |
| EP | 1 493 806 | 1/2005 |
| EP | 1 661 982 | 5/2006 |
| EP | 1 142 988 | 11/2006 |
| EP | 1 531 692 | 11/2006 |
| EP | 1 718 730 | 11/2006 |
| EP | 1 456 350 | 2/2007 |
| EP | 951 531 | 2/2007 |
| EP | 1 808 487 | 7/2007 |
| EP | 1 090 035 | 2/2008 |
| EP | 1 173 064 | 5/2008 |
| EP | 1 337 626 | 7/2008 |
| EP | 970 613 | 6/2010 |
| WO | WO 94/09636 | 5/1994 |
| WO | WO 95/31562 | 11/1995 |
| WO | WO 98/47521 | 10/1998 |
| WO | WO 99/08553 | 2/1999 |
| WO | WO 02/26059 | 4/2002 |
| WO | WO 02/056694 | 7/2002 |
| WO | WO 03/045172 | 6/2003 |
| WO | WO 2006/048457 | 5/2006 |
| WO | WO 2006/082267 | 8/2006 |
| WO | WO 2007/003917 | 1/2007 |
| WO | WO 2008/077229 | 7/2008 |
| WO | WO 2009/097333 | 8/2009 |
| WO | WO 2011/151494 | 12/2011 |
| WO | WO 2012/042223 | 4/2012 |

OTHER PUBLICATIONS

Amézquita A. et al., *Competitive inhibition of Listeria monocytogenes in ready-to-eat meat products by lactic acid bacteria*, J. Food Prot., vol. 65(2):316-25 (2002).

Awaisheh, S. et al., *Screening of antibacterial activity of lactic acid bacteria against different pathogens found in vacuum-packaged meat products*, Foodborne Pathog. Dis., vol. 6(9):1125-1132(2009).

Bueno, D. et al., *Lactobacillus casei CRL 431 and Lactobacillus rhamnosus CRL 1224 as biological controls for Aspergillus flavus strains*, J. Food Prot., vol. 69(10):2544-2548 (2006). (Review of abstract only).

Calderón O. et al., *Evaluation of the effect of Lactobacillus rhamnosus probiotic culture added to yogurt over Staphylococcus aureus, Escherichia coli 0157:H7, Listeria monocytogenes and Salmonella enteritidis populations*, Arch. Latinoam. Nutr., vol. 57(1):51-55 (2007) (Review of abstract only).

Madureira A. et al., *Incorporation of Probiotic Bacteria in Whey Cheese: Decreasing the Risk of Microbial Contamination*, J. Food Prot. 74(7):1194-1199 (2011).

Olasupo N. et al., *Studies on bacteriocinogenic Lactobacillus isolates from selected Nigerian fermented foods*, J. Basic Microbiol. 35(5):19-24 (1995).

Scolari G. et al., *Partial characterization and plasmid linkage of a non-proteinaceous antimicrobial compound in a Lactobacillus casei strain of vegetable origin*, J. App. Microbiol., 86(4): 682-688 (1999).

Vescovo M. et al., *Application of antimicrobial-producing lactic acid bacteria to control pathogens in ready-to-use vegetables*, J. Appl. Bacteriol. 81(2): 113-119 (1996).

Vescovo M. et al., *Inhibitory effect of selected lactic acid bacteria on microflora associated with ready-touse vegetables*, Lett. Appl. Microbiol., vol. 21(2): 121-125 (1995). (Review of abstract only).

Vescovo, M. et al., *Inhibition of Listeria innocua growth by antimicrobial-producing lactic acid cultures in vacuum-packed cold-smoked salmon*, Food Microbiol., vol. 23(7):689-693 (2006).

\* cited by examiner

BIOPRESERVATION METHODS FOR BEVERAGES AND OTHER FOODS

RELATED APPLICATIONS

This application claims the benefit of U.S. Provisional Application No. 61/840,332, filed, Jun. 27, 2013, the entire disclosure of which is incorporated by reference herein.

BACKGROUND

1. Field

Several embodiments of the invention relate to methods for improving the safety of certain food products that are intended to be maintained in cold storage, but that may be exposed to thermal abuse. In particular, several embodiments of the invention relate to the use of exogenous microorganisms to reduce spoilage, reduce growth or activity of unwanted microorganisms, increase shelf life, and/or impart other beneficial effects to beverages that have a pH above about 4.6.

2. Description of the Related Art

Food preservation is intended to prevent the growth of pathogenic microorganisms in order to prevent contamination of the food, rancidity of the food, and increase shelf life of the food.

SUMMARY

Many consumers desire freshly prepared foods, such as freshly prepared juices, not only for their flavors, but for their nutritional qualities. However, freshly prepared foods often require cold storage to avoid growth of adverse microorganisms, such as spoilage bacteria or other microorganisms that could lead to adverse effects if consumed. While many freshly prepared foods are properly stored and consumed without issues, fresh foods that are subject to temperature abuse may cause adverse consequences if consumed. There are therefore provided herein methods of using non-pathogenic microorganisms to control growth of pathogenic microorganisms, in order to improve the safety of freshly prepared foods that may be subject to temperature abuse. In several embodiments, there is provided a method of controlling the growth of pathogenic microorganisms in a low acid content food product, comprising providing low acid content food product having a pH greater than 4.5, inoculating the food product with a population of the microorganism *Lactobacillus casei* to generate an inoculated food product, wherein the inoculation results in a concentration of the microorganisms ranging from 10 to $10^7$ colony forming units (CFU)/gram of the food product, processing the inoculated food product using high pressure processing (HPP) to generate a stable food product, wherein at least a portion of the microorganisms remain viable after the HPP, wherein the stable food product is susceptible to a period of temperature abuse comprising elevation of the temperature of the stable food product to temperatures greater than 40° F., wherein, in response to the temperature abuse, the inoculated microorganisms reduce the pH of the stable food product to less than 4.5, wherein the reduction in pH inhibits the viability and/or metabolic activity of pathogenic microorganisms, thereby controlling the growth of pathogenic microorganisms.

In several embodiments, methods are provided for controlling the growth of pathogenic microorganisms in a low acid content food, such as a low acid juice, comprising inoculating a low acid content juice having a pH greater than about 4.6 (e.g., about 4.7, about 4.8, about 4.9, about 5.0, or higher) with a non-pathogenic lactic acid producing microorganism to generate an inoculated juice, processing the inoculated juice using high pressure processing (HPP) to generate a stable juice, wherein at least a portion of the non-pathogenic lactic acid producing microorganisms remain viable after the HPP, wherein the stable juice is susceptible to a period of temperature abuse comprising elevation of the temperature of the stable juice to temperatures greater than about 40° F., wherein, in response to the temperature abuse, the non-pathogenic lactic acid producing microorganisms produce lactic acid and reduce the pH of the stable juice to less than about 4.6. Advantageously, as a result of the reduction in pH, the viability and/or metabolic activity of pathogenic microorganisms is reduced, prevented or otherwise inhibited, thereby controlling the growth of pathogenic microorganisms.

There is additionally provided herein methods for controlling the growth of pathogenic microorganisms in a low acid content food product, comprising processing fruit, vegetables, or combinations thereof to generate a low acid content food having a pH greater than 4.5, inoculating the low acid content food with a population of lactic acid producing microorganisms to generate an inoculated food product, processing the inoculated food product using high pressure processing (HPP) to generate a stable food product, wherein at least a portion of the lactic acid producing microorganisms remain viable after the HPP, wherein the stable food product is susceptible to a period of temperature abuse comprising exposure to temperatures greater than 40° F., wherein, in response to the temperature abuse, the viable lactic acid producing microorganisms reduce the pH of the stable food product to less than 4.5, wherein the reduction in pH inhibits the viability and/or metabolic activity of pathogenic microorganisms, thereby controlling the growth of pathogenic microorganisms.

Further, there is also provided herein a method of controlling the growth of pathogenic microorganisms in a low acid content food product, comprising processing fruit, vegetables, or combinations thereof to generate a low acid content food having a pH greater than about 4.6, inoculating the low acid content food with a population of lactic acid producing microorganisms to generate an inoculated juice, processing the inoculated juice using high pressure processing to generate a stable juice, wherein at least a portion of the lactic acid producing microorganisms remain viable after the HPP, wherein the stable juice is susceptible to a period of temperature abuse comprising exposure to temperatures greater than about 40° F., wherein, in response to the temperature abuse, the viable lactic acid producing microorganisms reduce the pH of the stable juice to less than about 4.6, and wherein the reduction in pH inhibits the viability and/or metabolic activity of pathogenic microorganisms, thereby controlling the growth of pathogenic microorganisms. There are also methods provided herein relating to controlling the growth of pathogenic microorganisms in a low acid content food product, comprising providing low acid content food product having a pH greater than 4.6, inoculating the food product with between 10 to $10^7$ colony forming units (CFU)/gram of food product of a population of lactic acid producing microorganisms to generate an inoculated food product, exposing the inoculated food product to a pressure of greater than about 80,000 pounds per square inch (PSI) for between 30 and 200 seconds, with an increase in temperature of the inoculated food product of less than 15 to 20° F., thereby generating a stable food product, wherein, in response to elevation of the temperature of the stable food product to temperatures greater than 40° F., the inoculated microorganisms reduce the pH of the stable food product to inhibit the viability and/or metabolic activity of pathogenic microorganisms.

In several embodiments, the non-pathogenic lactic acid producing microorganisms are inoculated such that a the concentration of the microorganisms ranges from about 10 to about $10^7$ colony forming units (CFU)/gram of the juice. In several embodiments, the non-pathogenic lactic acid producing microorganism is a population of the microorganism *Lactobacillus*. In one embodiment, the *Lactobacillus casei* comprises *Lactobacillus casei* from the subspecies *rhamnosus*. In one embodiment, the *Lactobacillus casei* comprises *Lactobacillus casei* from subspecies *rhamnosus* 842. Depending on the embodiments, the *Lactobacillus casei* may also comprises *Lactobacillus casei* having all the identifying characteristics of *Lactobacillus casei rhamnosus* 842 NRRL-B-15972.

After the HPP, at least some portion of the inoculated non-pathogenic lactic acid producing microorganisms is rendered at least partially non-viable. In several embodiments, however, the concentration of the microorganisms ranges from about 10 to about $10^5$ colony forming units (CFU)/gram of the juice after the HPP, including about 10 to about $10^2$, about $10^2$ to about $10^3$, about $10^3$ to about $10^4$, about $10^4$ to about $10^5$ colony forming units (CFU)/gram of the juice, and overlapping ranges thereof.

In several embodiments, the temperature abuse comprises elevation of the temperature of the stable juice to temperatures to temperatures of about 70° F. or greater for at least about six hours. For example, in several embodiments, temperature abuse (e.g., juice or other food being held at an elevated temperature which allows the growth or activity of one or more types of pathogenic microorganism) occurs within about 6-12 hours of a juice reaching an elevated temperature, or within about 12-24 hours, about 18-36 hours, about 24-48 hours, about 36-72 hours, and times therebetween. Advantageously, however, the methods disclosed herein result in a pH reduction (sufficient to inhibit, at least partially the growth or activity of a pathogenic microorganism such as *clostridium botulinum*) within about 3 to about 5 days from the inception of the temperature abuse. Depending on the embodiment (and the temperature of the juice), pH reduction occurs within about 8 to about 12 days from the inception of the temperature abuse. In several embodiments, temperature abuse occurs when the temperature of the stable juice reaches (and is held at) temperatures of about 45° F. or greater. In several embodiments, temperature abuse occurs when the temperature of the stable juice reaches (and is held at) temperatures of about 50° F. to about 55° F. In several embodiments, temperature abuse comprises elevation of the temperature of the stable food product (e.g., stable juice) to temperatures between 45° F. to 60° F.

Surprisingly, and advantageously, the pH of the stable juice remains substantially unchanged if the stable juice is not exposed to temperatures of greater than about 40° F. For example, the inoculated microorganisms reduce the pH of the stable juice to below 4.6 upon elevation of the temperature of the juice to above 40° F., and wherein the inoculated population does not reduce the pH of the of the juice to 4.6 or below if the temperature of the juice is elevated to above 42° F.

In several embodiments, the lactic acid producing microorganisms are optionally encapsulated. In several embodiments, the lactic acid producing microorganisms are not encapsulated. In several embodiments, the lactic acid producing microorganisms comprise a dry culture. In several embodiments, the lactic acid producing microorganisms comprise a liquid culture. Combinations of liquid and dried cultures, and/or encapsulated/non-encapsulated cultures can also be used in certain embodiments.

In several embodiments, the pathogenic microorganism that can cause adverse effects is selected from the group consisting of *C. botulinum, C. butyricum, C. baratii, C. argentinense*, and combinations thereof. In several embodiments, the pathogenic microorganism further comprises one or more of the following microorganisms: microorganisms from the genus *Salmonella*, microorganisms from the genus *Lysteria*, microorganisms from the genus *Leuconostoc*, microorganisms from the genus *Pediococcus*, and/or *E. Coli*.

In several embodiments, the low acid food product comprises a low-acid juice. In several embodiments, the low acid juice comprises carrot juice. Combinations of fruits and/or vegetables are treated with the biocontrol methods disclosed herein, in several embodiments. For example, in several embodiments, the low acid juice comprises juice from one or more of carrots, celery, beet, ginger, apple, lemon, spinach, and parsley. In several embodiments, the low acid juice from one or more of celery, cucumber, parsley, lemon, wheat grass, apple, spinach, romaine lettuce, and clover sprouts. In several embodiments, the low acid juice comprises juice from one or more of celery, spinach, romaine lettuce, clover sprouts, cucumber, and wheat grass. Depending on the embodiment, the juices optionally further comprise lime juice. In several embodiments, the low acid juice comprises juice from one or more of juice and/or pulp of one or more orange, apple, raspberry, *chlorella*, barley grass, mango, pineapple, sprirulina, wheat grass and dulse. In several embodiments, the low acid content food comprises a smoothie, which may optionally further include water, milk, vitamins, and the like. For example, in several embodiments, the low acid content food further comprises one or more of grains, algae, cyanobacterium, or byproducts or components thereof.

In several embodiments, the low acid content food product or juice has an initial pH between about 5.0 and about 6.5, e.g., a pH sufficiently high that pathogenic microorganisms could grow or become active if the juice was subjected to elevated temperatures for a sufficient period of time (e.g., hours to days, depending on the temperature).

In several embodiments, the low acid content juice has not been thermally pasteurized. Advantageously, the methods provided herein result in a nominal temperature increase (due to the pressure of HPP), and therefore the flavor profiles of the juices are not adversely impacted. In several embodiments, the HPP processing results in an increase in temperature of the stable juice of less than about 10 to about 20° F. In several embodiments, the HPP employs pressure of greater than about 80,000 pounds per square inch (PSI), greater than about 85,000 PSI, greater than about 87,000 PSI, or more. The dwell time (e.g., the time the food or juice is subjected to the high pressure) ranges from about 20 to about 300 seconds, such as for example, about 30 seconds, about 90 seconds, or greater than about 180 seconds.

Advantageously, in several embodiments, not only do the methods disclosed herein result in biocontrol against pathogenic microorganisms, in several embodiments, the generation of the stable juice further prevents the spoilage of the stable juice (e.g., enhances the shelf life of the juice).

Also provided herein are beverages treated according to any one of the methods disclosed. For example, there is provided a liquid food product configured for processing, distribution and storage at cold storage temperatures between about 35° F. to about 42° F., comprising a low acid juice made from fruits, vegetables, or combinations thereof and comprising an inoculated population of lactic acid producing bacteria, wherein the low acid juice has a pH of greater than about 4.6, wherein the low acid juice has been processed with high pressure processing (HPP) configured for at least a 5 log reduction of pathogens selected from the group consisting of *E. coli, Salmonella* sp., *Lysteria monocytogenes*, and combinations thereof, wherein at least a portion of the inoculated population of lactic acid producing bacteria survive the HPP and will: (i) reduce the pH of the of the low acid juice to a pH below about 4.6 if the juice is exposed to temperatures above about 42° F., or (ii) will not reduce the pH of the of the low acid juice to a pH of about 4.6 or below if the juice is not exposed to temperatures above about 42° F.

There is also provided a beverage comprising a low acid juice made from fruits, vegetables, or combinations thereof and an inoculated population of lactic acid producing bacteria, wherein the low acid juice has a pH of greater than about 4.6, wherein the inoculated population reduces the pH of the of the low acid juice to a pH below about 4.6 if the juice is exposed to temperatures above about 42° F., and wherein the inoculated population does not reduce the pH of the of the low acid juice to a pH of about 4.6 or below if the juice is not exposed to temperatures above about 42° F.

Also provided is a low acid juice comprising juice from fruits, vegetables, or combinations thereof, and a population of lactic acid producing bacteria comprising *lactobacillus casei*.

The methods summarized above and set forth in further detail below describe certain actions taken by a first party; however, it should be understood that they can also include the instruction of those actions by another party. Thus, actions such as "inoculating a food product with a population of microorganisms" include "instructing the inoculation of a food product with a population of microorganisms."

DETAILED DESCRIPTION

General

Figure 1:
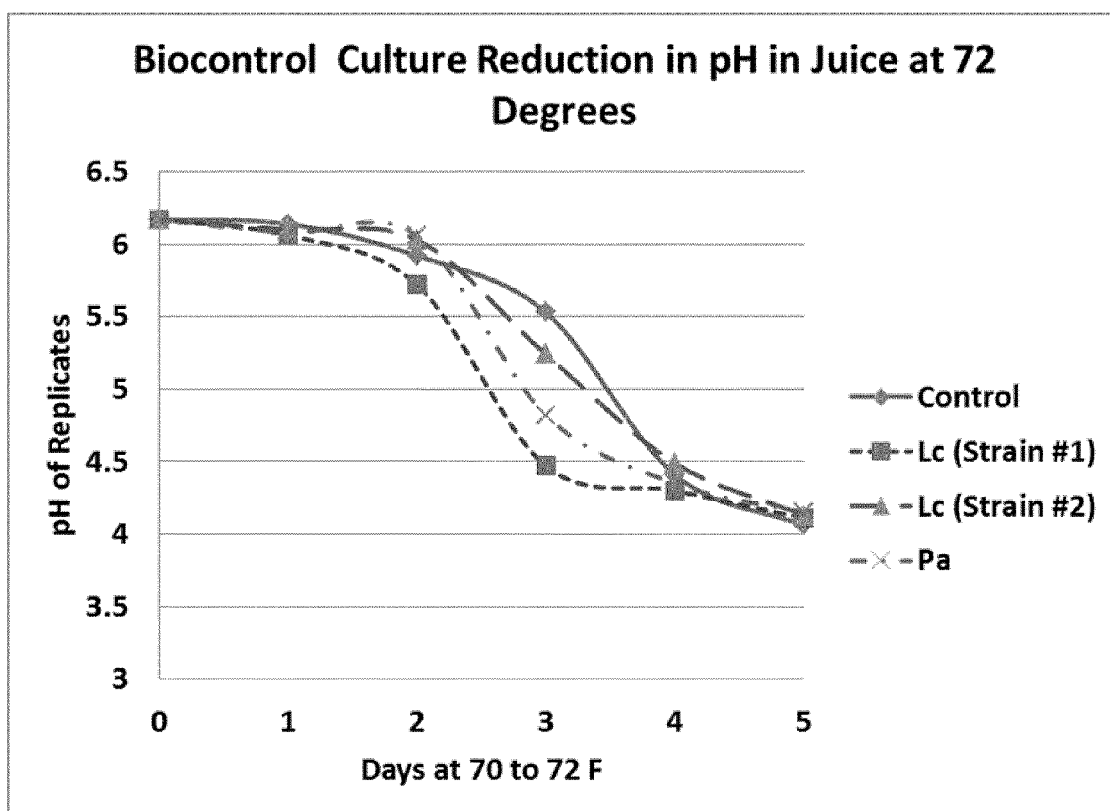
FIG. 1 depicts data related to the rate at which certain lactic acid producing bacteria decrease the pH of low acid juice when the temperature of the juice is between about 70-72° F.
Figure 2:
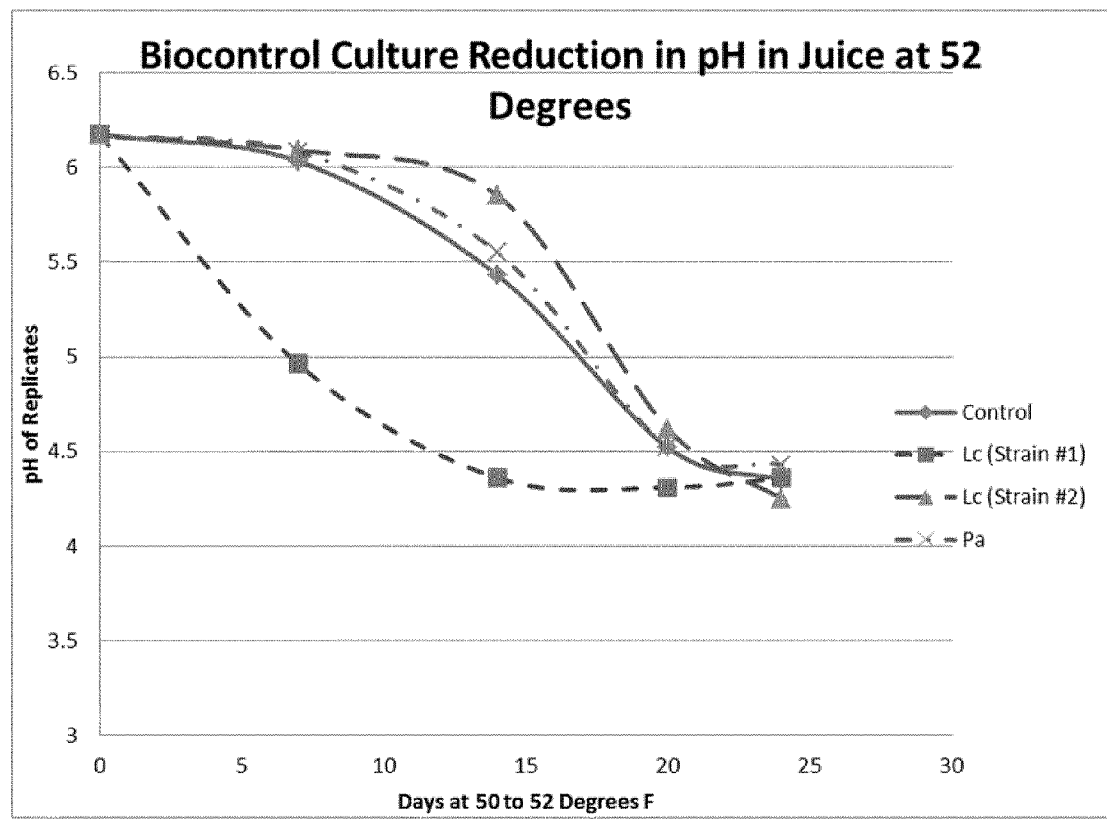
FIG. 2 depicts data related to the rate at which certain lactic acid producing bacteria decrease the pH of low acid juice when the temperature of the juice is between about 50-52° F.
Figure 3:
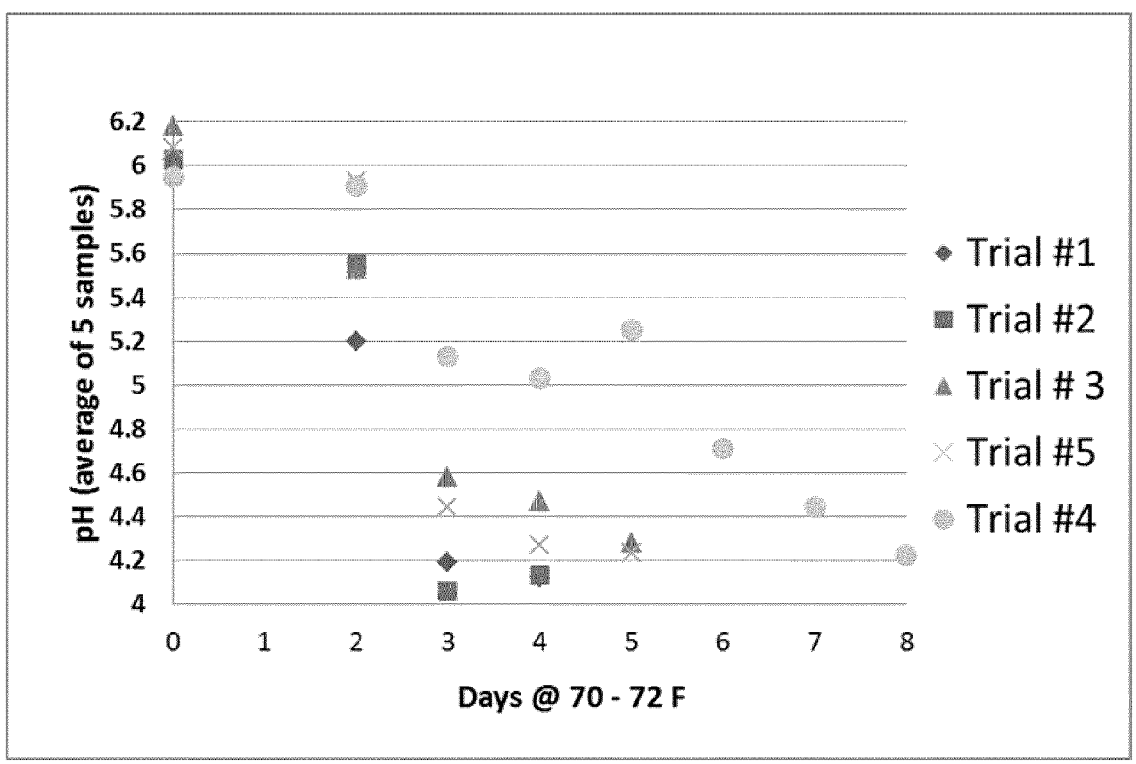
FIG. 3 depicts summary data of the pH decrease in five individual trials when low acid juice was held at temperatures of 70-72° F.
Figure 4:
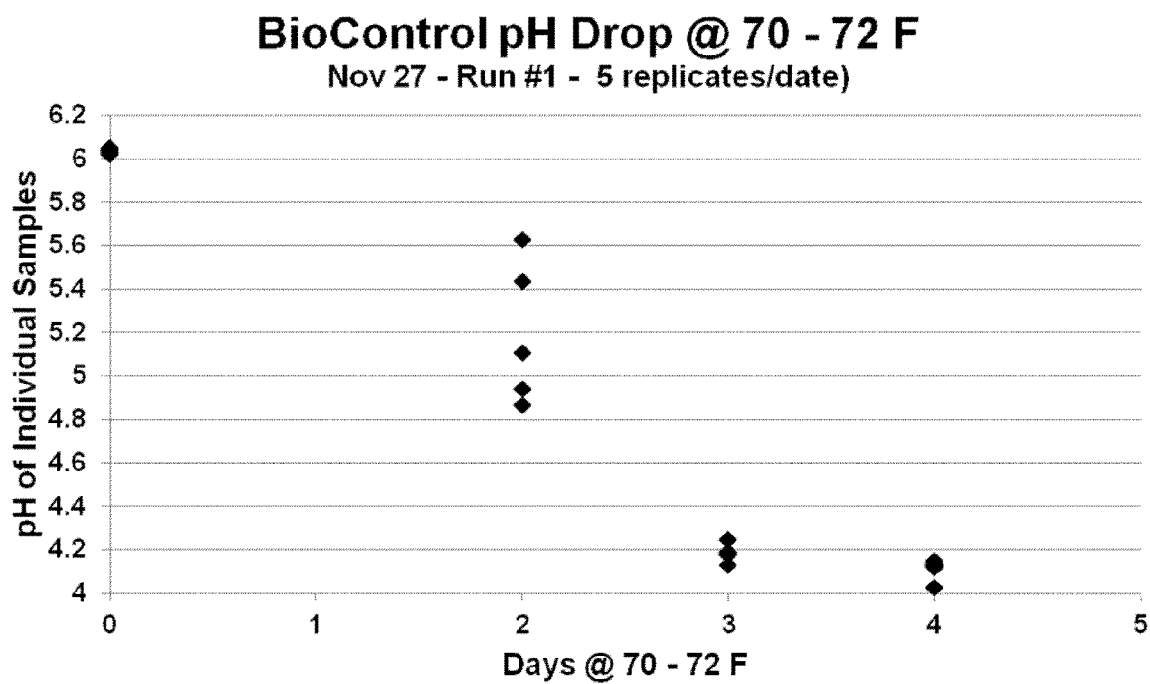
FIG. 4 depicts replicate data points taken at each time point in one individual trial evaluating pH drop after juice was held at temperatures of 70-72° F.
Figure 5:
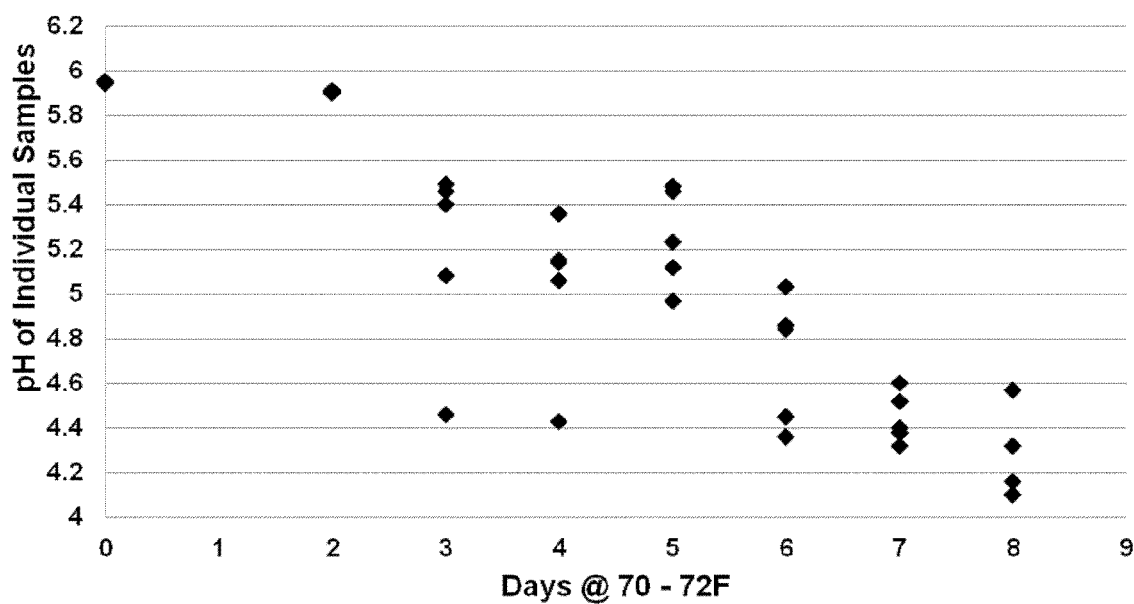
FIG. 5 depicts replicate data points taken at each time point in one individual trial (Trial #4 of FIG. 3) evaluating pH drop after juice was held at temperatures of 70-72° F.
Figure 6:
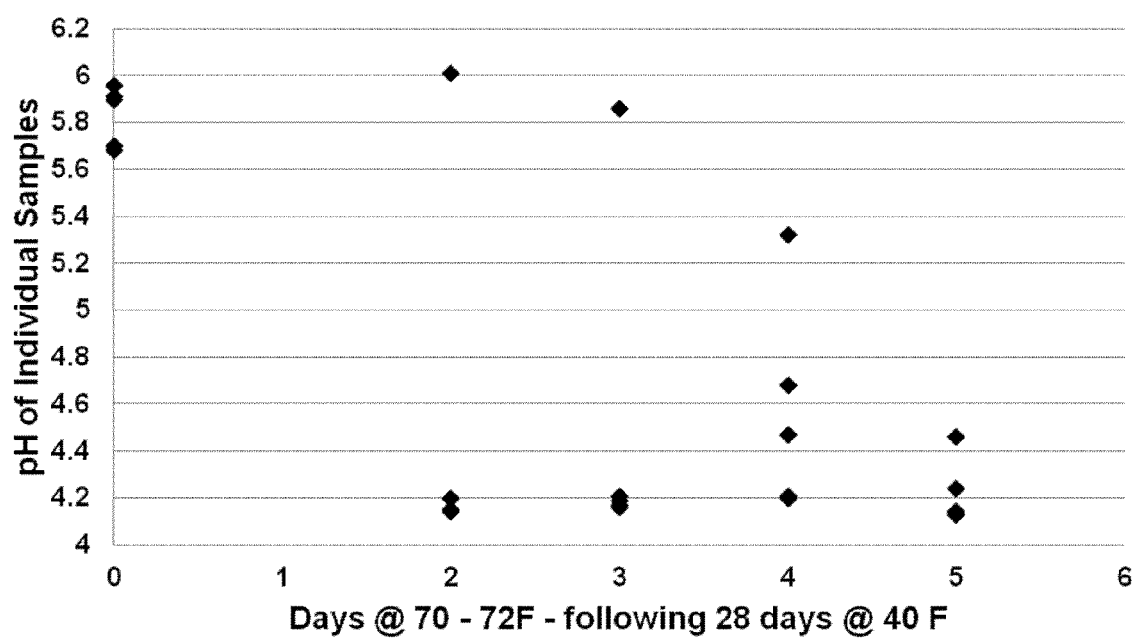
FIG. 6 depicts data summary data of the pH decrease in five individual trials with low acid juice raised to temperatures of 70-72° F. after the juice was held at 40° F. for 28 days prior to the temperature abuse.
Figure 7:
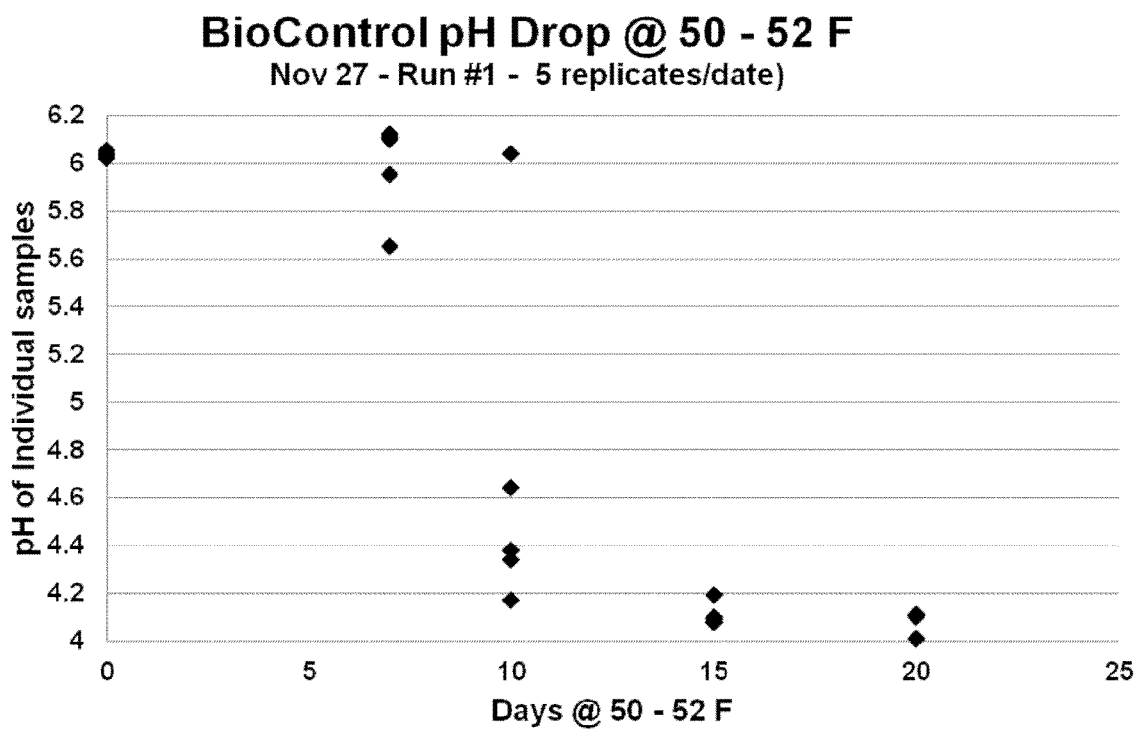
FIG. 7 depicts replicate data points taken at each time point in one individual trial evaluating pH drop after low acid juice was held at temperatures of 50-52° F.
Figure 8:
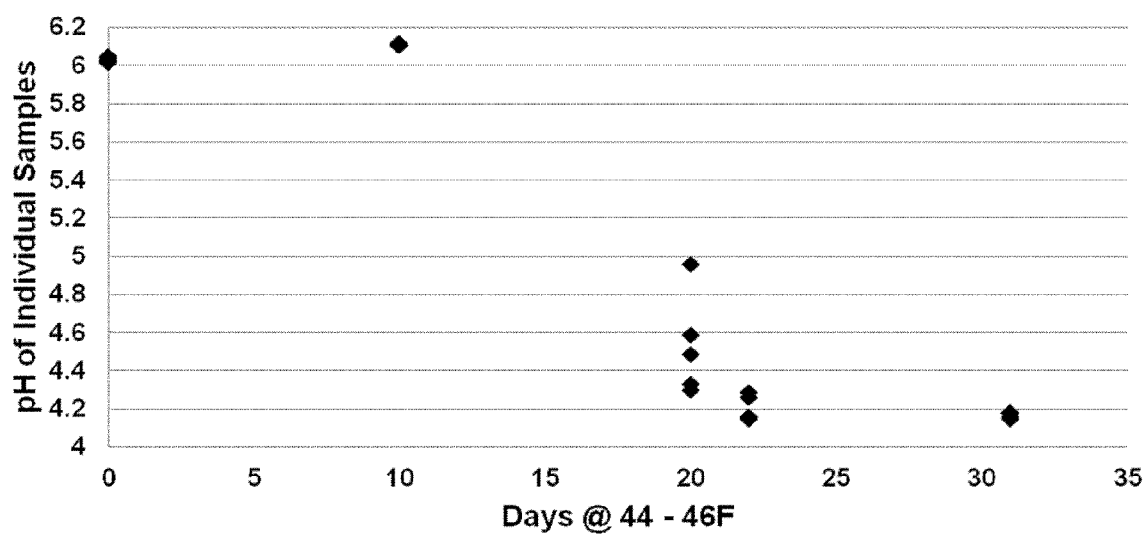
FIG. 8 depicts replicate data points taken at each time point in one individual trial evaluating pH drop after low acid juice was held at temperatures of 44-46° F.

Fresh, flavorful and nutritious foods are of interest to many consumers in the marketplace. In many cases, consumers also seek foods that are free of preservatives. Preservatives often change the flavor of foods, reduce nutritional quality, or otherwise alter the palatability of the end product. Foods that are fresh and preservative free are potentially subject to spoilage or contamination that can result in unpalatable food, or cause other undesirable effects if the consumer improperly subjects the food to temperature abuse.

Refrigeration, preservatives and heat-based pasteurization are common ways to reduce or prevent spoilage or contamination, such as that caused by certain microorganisms. Each of these methods, however, has certain drawbacks that come into play when producing a fresh and preservative-free food.

While certain microorganisms yield adverse effects when present in a food, other nonpathogenic microorganisms can impart beneficial effects to a food and help address the shortcomings of refrigeration, preservatives and/or heat-based pasteurization. In several embodiments of the methods disclosed herein, nonpathogenic microorganisms are introduced into a fresh food product and the nonpathogenic microorganisms and/or metabolic products that they produce serve to control, inhibit, or otherwise reduce the adverse effects of pathogenic or toxin-producing microorganisms in food products. Thus, the methods disclosed herein are, in several embodiments, directed to food preservation and/or consumer safety through the use of exogenous microorganisms. Such embodiments serve as an advantageous alternative food preservation system that is particularly-well suited for the preservation of fresh foods, such as beverages that contain fruits and/or vegetables.

Food Preservation Methods

As described below, a variety of food preservation methods exist, such as, pasteurization, refrigeration, preservatives, drying, freezing, curing (salt and/or sugar), smoking, pickling, irradiation, etc.

Pasteurization

Pasteurization refers to the heating of a food product, often a liquid, to a specific elevated temperature, holding it at that elevated temperature, and then cooling immediately after a predetermined period of time. While varied temperatures are used, depending on the food to be pasteurized, the food product is generally heated to a temperature of between about 145° F. and 280° F. As the temperature is increased, the hold time is reduced. For example, flash pasteurization employs temperatures of between about 160° F. to 165° F., for about 15 to 30 seconds. In contrast, vat pasteurization uses a temperature of about 145° F. for about 30 minutes. Certain pasteurization processes are expensive, as they must be used in conjunction with sterile processing techniques to bottle/package the food. Moreover, the elevated temperatures used in pasteurization cause a loss of some vitamin and mineral content, can breakdown certain beneficial nutritional components of the food, and/or adversely affect the flavor or palatability of the food.

Pasteurization is not typically performed in order to kill all microorganisms in the food; rather, it is intended to reduce the number of viable pathogenic microorganisms so that they are unlikely to cause spoilage. This, however, rests on the assumption that the food is stored as recommended and consumed before the expiration of its shelf life.

Moreover, certain pathogenic microorganisms exist in the form of spores that are particularly resistant to the temperatures of pasteurization. Pasteurized foods are also often packaged with minimal, or without, oxygen present, in order to reduce oxidation of the pasteurized food. However, these spore-forming microorganisms are often obligate anaerobic or functional anaerobes, and thus, such microorganism can survive (or even thrive) in a low oxygen environment. Despite the seemingly adverse environmental conditions in a pasteurized food product, when the food product is exposed to altered conditions (e.g., opening the food packaging, exposure to non-cold-storage temperatures, etc.), growth or activity of pathogenic microorganism can result that cause food spoilage and/or other undesired effects (e.g., toxin production).

Cold Storage

Cold storage is typically used to store foods that have been pasteurized. The lower temperatures of cold storage reduce the growth of microorganisms (whether pathogenic or non-pathogenic), as microorganisms typically are more metabolically active at elevated temperatures (e.g., room temperature, approximate body temperatures). However, as discussed above, the value of cold storage of a pasteurized food is limited by the possibility that the food is mishandled during production, processing, storage, shipping, etc. In other words, if a food product intended to be held in cold storage is subject to a period of elevated temperature (known as thermal abuse or temperature abuse), microorganisms may be able to proliferate. Unfortunately, the proliferation of certain pathogenic microorganisms occurs in the absence of readily detectable signs of spoilage of a food, increasing the chance that a consumer would ingest the food that was contaminated with active pathogenic microorganisms.

Preservatives

While many naturally occurring preservatives exist (e.g., salt, vinegar, etc.) a variety of preservative food additives are commonly used in consumer food products. Preservatives can either function as antimicrobial preservatives (e.g., those which act to inhibit the growth microorganisms, fungi or mold) or antioxidants preservatives (e.g., oxygen absorbers, which act to inhibit oxidation of food components). Common antimicrobial preservatives used are sorbic acid, benzoic acid, calcium propionate, sodium nitrite, sodium sulfites (sulfur dioxide, sodium bisulfite, potassium hydrogen sulfite, etc.) and disodium EDTA, among others. Common antioxidants include butylated hydroxyanisole (BHA), butylated hydroxytoluene (BHT), ascorbic acid and tocopherols, among others.

Certain preservatives can adversely impact the flavor of some foods. Moreover, many consumers seek preservative-free foods based on a desire to consume less processed and more nutritious fresh foods.

Alteration of Gaseous Conditions

Another approach employed to limit the growth and/or activity of certain pathogenic and/or spoilage microorganisms is to alter the gas content (e.g., $CO_2$ or $O_2$ concentration) in the environment in which the pathogenic and/or spoilage microorganisms are expected to be. However, this approach is fairly narrow in its efficacy, as many pathogenic and/or spoilage microorganisms are aerobic and many others are anaerobic. Thus, the reduction in oxygen to limit the growth of one type may favor the growth of another type.

High Pressure Processing

High pressure processing (HPP) employs significant increases in pressure to reduce the microorganism load of food products, rather than heat (as with pasteurization). Depending on the food to be processed, HPP employs pressure ranging from about 60,000 pounds per square inch to about 90,000 pounds per square inch. While HPP can result in a modest temperature increase (of about 15-20° F.; e.g., from a cold storage temperature of about 35° F. to a temperature under high pressure of about 50 to 55° F.), the resultant temperature may be insufficient to have an adverse effect on microorganisms. In contrast, the high pressures exerted on the food kill or inactivate microorganisms by either i) changing the permeability of the cell wall of a microorganism (causing death of the microorganism), ii) functionally alter the enzymes or active sites of enzymes or receptors (causing death or inactivity by metabolic dysfunction), iii) inducing alterations in microorganism DNA structure, iv) or combinations thereof or other mechanisms. Exposure to elevated pressures varies depending on the food being processed, but can range from a few seconds to a few minutes. While HPP does not kill or inactivate all microorganisms (e.g., certain spore-forming bacteria as well as some non-spore forming non-pathogenic bacteria are still viable after HPP), advantageously causes minimal changes in the fresh characteristics of foods by eliminating thermal degradation (as occurs with pasteurization). Thus, in several embodiments, HPP results in foods with fresher taste, and better appearance, texture and more retained nutrients. HPP also reduces the risk of thermally induced cooked off-flavors, making it especially beneficial for heat-sensitive foods. The improved flavor profile of HPP foods and the improved nutritional value make HPP processed foods desirable to many consumers.

Temperature Abuse

As discussed above, many foods that are intended to be manufactured, processed, shipped, and stored at cold-storage temperatures are susceptible to spoilage (either through microorganism growth or other means) and/or microorganism contamination if they are exposed to elevated temperatures. As used herein, the term "cold-storage" shall be given its ordinary meaning and shall also include temperatures between about 30 to about 40° F., including about 30 to about 32° F., about 32 to about 34° F., about 34 to about 36° F., about 36 to about 38° F., about 38 to about 40° F., and overlapping ranges thereof. When foods are exposed to elevated temperatures for certain non-acute time periods sufficient to raise the temperature of the food above cold storage temperatures, this exposure can be considered temperature abuse. As used herein, the terms "temperature abuse" and "thermal abuse" shall be given their ordinary meaning, and shall also include exposure of foods intended to be maintained at cold storage temperatures exposed to elevated temperatures for a period of time sufficient to allow growth of microorganisms. For example, as discussed herein, there are two main groups of C. botulinum, a proteolytic strain and a non-proteolytic strain. The proteolytic strain can grow at temperatures around about 70° F., while non-proteolytic strain can grow at temperatures of about 42-55° F. However, the proteolytic strain is susceptible to pH less than about 4.6, while the non-proteolytic strain is susceptible (e.g., cannot grow) to pH of about 5 or less. Thus, in several embodiments temperature abuse can occur when food (e.g., low acid juices) are exposed to temperatures that cause the temperature of the food to reach temperatures of about 42° F. or greater. While acute exposure may not constitute temperature abuse (as the temperature of the food does not increase sufficiently for pathogenic microorganism growth/activity), in some embodiments, temperature abuse can occur in about 2 to about 4 hours, about 4 to about 6 hours, about 6 to about 12 hours, about 12 to about 24 hours about 24 to about 48 hours, about 48 to about 72 hours, about 92 to about 96 hours, or longer. The greater the temperature to which the food product is exposed the lesser the time of exposure may need to be in order to have temperature abuse occur. In several embodiments, temperature abuse includes exposure of a food product (such as a juice) to temperatures greater than about 40 to about 50° F. for longer than 6 hours, 12 hours, 24 hours or 48 hours. In several embodiments, temperature abuse includes exposure of a food product (such as a juice) to temperatures and times sufficient to increase the number of spoilage organisms to at least 10-fold greater than were present prior to temperature abuse.

Biocontrol

Biocontrol, as discussed herein, relates generally methods for promoting food safety by facilitating the growth and metabolism of selected microorganisms to prevent the growth of hazardous (e.g., pathogenic) microorganisms. More specifically, several embodiments are directed to the use of non-pathogenic microorganisms to control (e.g., reduce, minimize, or prevent) the growth, viability and/or activity of pathogenic microorganisms in a food product, in particular in the event of temperature abuse. In several embodiments, biocontrol is used in conjunction with a food preservation method, such as those discussed above. For example, in several embodiments biocontrol is employed in conjunction with HPP, thereby capitalizing on the advantageous nature of HPP with respect to maintaining freshness and nutritional value of foods, while also exploiting the non-pathogenic microorganism characteristics to reduce risk of growth or activity of pathogens. In several embodiments, the HPP is configured to reduce the amount of certain pathogenic microorganisms present in a food product by at least about 5-log. However, in several embodiments, biocontrol is used without an additional food preservation technique. In several embodiments, biocontrol is used in combination only with cold storage.

Several embodiments of the preservation methods combining biocontrol with HPP are particularly beneficial for protection against thermal abuse of foods. As discussed above, the quality, freshness, and safety of a food product that reaches a consumer is dependent on the maintenance of the product under appropriate storage conditions during all stages of its life cycle (e.g., preparation through consumption). While potential thermal abuse of a food can be addressed by addition of, for example, preservatives, as discussed herein, preservative-free foods are desirable to many consumers. As discussed in greater detail below, several embodiments of the biocontrol methods disclosed herein reduce or obviate the need for preservatives and protect against the growth or activity of pathogenic microorganisms, resulting in a food that has desirable flavor profiles, and is safe for consumption, even in the event of temperature abuse.

Non-pathogenic Microorganisms

As discussed above, certain pathogenic microorganisms can lead to food spoilage certain foods contaminated with those pathogenic microorganisms. However, according to the methods disclosed herein the addition of certain nonpathogenic microorganisms in conjunction with one or more food preservation techniques discussed above can reduce the risk of adverse effects when a food contaminated with pathogenic microorganisms is consumed. Nonpathogenic microorganisms, depending on the embodiment, can comprise bacteria, yeast, fungi, or combinations thereof. In several embodiments, the nonpathogenic microorganisms are naturally occurring, while in other embodiments, the nonpathogenic microorganisms are optionally genetically modified. In several embodiments, bacteria are used as the nonpathogenic microorganism. Depending on the embodiment, the bacteria may be gram positive or gram negative. Combinations of gram-positive and gram-negative bacteria are also used in certain embodiments. In some embodiments, encapsulated bacteria are used. However, in certain embodiments non-encapsulated bacteria are used. In several embodiments, lactic acid producing bacteria are used. In several embodiments, lactic acid producing bacteria which are resistant (at least partially) to HPP are used.

For example, microorganisms from the genus Lactobacilli which are homo-fermentative (Group 1) are relatively resistant to HPP. Thus, in some embodiments, homo-fermentive bacteria are used. As used herein, the term homo-fermentive shall be given its ordinary meaning and shall also include bacteria which produce only lactic acid through the metabolism of sugars. One non-limiting example of a homo-fermentative *lactobacillus* is *Lactobacillus acidophilus* (also recognized as a probiotic). Other non-limiting examples of Group 1 Lactobacilli include *L. acidophilus, L. delbrueckii, L. helveticus, L. salivarius*, among others. However, as discussed in more detail below, it was surprisingly discovered that lactic acid bacteria grouping (e.g., classification as homo- or hetero-fermentive; classification as cocci or rod) did not necessarily characterize the likelihood that a microorganism would survive HPP (and thus be useful in the methods of the invention disclosed herein). Thus, surprisingly, traditional classification methodologies cannot necessarily be used to identify microorganisms that are efficacious in the claimed methods. Thus, in several embodiments, other types of Lactobacilli (e.g., hetero-fermentive) are used in several embodiments. Hetero-fermentive, as used herein, shall be given its ordinary meaning, and shall also include bacteria that produce either alcohol or lactic acid through the metabolism of sugars.

In some embodiments, the bacteria are facultative bacteria. As used herein, the term facultative shall be given its ordinary meaning, and shall also include bacteria that can live under aerobic, anoxic, and/or anaerobic conditions. In some embodiments, the bacteria used our bacteria capable of only living in one of such conditions (e.g., obligate anaerobes).

In those embodiments employing lactic acid producing bacteria, depending on the embodiment, a variety of different types of lactic acid bacteria may be used. For example, the lactic acid producing bacteria may be selected from the following genera: *Lactobacillus, Bacillus, Leuconostoc, Pediococcus, Lactococcus, Streptococcus, Aerococcus, Carnobacterium, Enterococcus, Oenococcus, Sporolactobacillus, Tetragenococcus, Vagococcus,* and *Weisella*. As discussed herein, combinations of bacteria from one or more of the genera listed may be used.

In several embodiments, bacteria from the *Lactobacillus* genera are used. Depending on the embodiment, the bacteria can be selected from one or more of the following *lactobacillus* species: *L. acetotolerans, L. acidifarinae, L. acidipiscis, L. acidophilus, L. agilis, L. algidus, L. alimentarius, L. amylolyticus, L. amylophilus, L. amylotrophicus, L. amylovorus, L. animalis, L. antri, L. apodemi, L. aviaries, L. bifermentans, L. brevis, L. buchneri, L. camelliae, L. casei, L. casei* subsp. *Rhamnosus, Lactobacillus casei* subsp. *rhamnosus 842, L. casei DN-114001, L. casei Shirota, L. catenaformis, L. ceti, L. coleohominis, L. collinoides, L. composti, L. concavus, L. coryniformis, L. crispatus, L. crustorum, L. curvatus, L. delbrueckii* subsp. *Delbrueckii, L. delbrueckii* subsp. *Bulgaricus, L. delbrueckii* subsp. *Lactis, L. dextrinicus, L. diolivorans, L. equi, L. equigenerosi, L. farraginis, L. farciminis, L. fermentum, L. formicalis, L. fructivorans, L. frumenti, L. fuchuensis, L. gallinarum, L. gasseri, L. gastricus, L. ghanensis, L. graminis, L. hammesii, L. hamster, L. harbinensis, L. hayakitensis, L. helveticus, L. hilgardii, L. homohiochii, L. iners, L. ingluviei, L. intestinalis, L. jensenii, L. johnsonii, L. kalixensis, L. kefiranofaciens, L. kefiri, L. kimchii, L. kitasatonis, L. kunkeei, L. leichmannii, L. lindneri, L. malefermentans, L. mali, L. manihotivorans, L. mindensis, L. mucosae, L. murinus, L. nagelii, L. namurensis, L. nantensis, L. ohgofer-*

*mentans, L. oris, L. panis, L. pantheris, L. parabrevis, L. parabuchneri, L. paracasei, L. paracolhnoides, L. parafarraginis, L. parakefiri, L. parahmentarius, L. paraplantarum, L. pentosus, L. perolens, L. plantarum, L. pontis, L. psittaci, L. rennini, L. reuteri, L. rhamnosus, L. rimae, L. rogosae, L. rossiae, L. ruminis, L. saerimneri, L. sakei, L. sahvarius, L. sanfranciscensis, L. satsumensis, L. secahphilus, L. sharpeae, L. siliginis, L. spicheri, L. suebicus, L. thailandensis, L. ultunensis, L. vaccinostercus, L. vaginalis, L. versmoldensis, L. vini, L. vituhnus, L. zeae,* and *L. zymae.* Combinations of one or more of these species and or subspecies *are* used, in certain embodiments.

In several embodiments, bacteria from the *Pediococcus* genera are used. Depending on the embodiment, the bacteria can be selected from one or more of the following *Pediococcus* species: *P. acidilactici, P. cellicola, P. claussenii, P. damnosus, P. ethanohdurans, P. inopinatus, P. parvulus, P. pentosaceus,* and *P. stilesii.* Combinations of one or more of these species and or subspecies *are* used, in certain embodiments.

In several embodiments, the initial amount of the non-pathogenic microorganism (or combination of multiple types of microorganism) ranges from about 1 colony forming unit (CFU)/gram of food to about $1 \times 10^8$ CFU/gram of food. In several embodiments, the inoculum of non-pathogenic microorganism(s) ranges from between about 1 to about 10 CFU/g, between about 10 and 100 CFU/g, between about 100 and about 1000 CFU/g, between about 1000 and about $1 \times 10^4$ CFU/g, between about $1 \times 10^4$ and about $1 \times 10^5$ CFU/g, between about $1 \times 10^5$ and $1 \times 10^6$ CFU/g, between about $1 \times 10^6$ and $1 \times 10^7$ CFU/g, between about $1 \times 10^7$ and $1 \times 10^8$ CFU/g and overlapping ranges thereof. In foods that may be particularly susceptible to contamination with pathogenic microorganisms that are acid-sensitive, greater inoculum concentrations may also be used.

In several embodiments of the biocontrol methods disclosed herein, the non-pathogenic microorganisms used are partially susceptible to elimination by a food preservation method, but are not eradicated by that method. For example, in several embodiments, biocontrol is used in conjunction with HPP. As discussed above, HPP functions to eliminate many (but not all) microorganisms. In particular, several embodiments employ non-pathogenic microorganisms inoculated into a food that survive HPP (or other food preservation method) in sufficient quantities that, should temperature abuse of the food occur, sufficient quantities to produce lactic acid and prevent or reduce the growth and/or activity of certain pathogenic microorganisms. Thus, in several embodiments, at least a portion (e.g., about 1%, about 5%, about 10%, 15%, about 20%, about 25% or more) of the non-pathogenic microorganisms survive HPP, in particular an HPP process that is configured to reduce the amount of a known pathogen (e.g., one most likely to be present in a food product) by at least 5-log. Advantageously, in several embodiments, if the food has not been exposed to a period of temperature abuse, the non-pathogenic microorganisms do not alter the pH (or otherwise adversely affect) the food.

Pathogenic Microorganisms

A variety of different pathogenic microorganisms can exist in a food product. For example, *C. Botulinum,* as discussed above, can form spores that are resistant to many food processing methods and, under the right conditions, the spores germinate into vegetative cells which then grow and produce botulinum toxin. The ingestion of the toxins produced by the vegetative cells, rather than ingestion of the spores themselves, may be the primary cause of undesired effects. Other microorganisms that can produce similar botulism toxins include, but are not limited to *C. butyricum, C. baratii* and *C. argentinense.* Also of potential concern are pathogenic microorganisms from the genera *Salmonella, E. Coli,* and/or *Lysteria* (e.g., *Lysteria monocytogenes*). Foods contaminated with pathogenic microorganisms from the genus *Leuconostoc* (e.g., *L. mesenteroides*) and *Pediococcus* (e.g., *P. pentosaceus*), among others. Combinations of one or more these pathogenic microorganisms may also cause issues in food products subject to temperature abuse.

Biocontrol to Reduce Adverse Effects of Temperature Abuse

Temperature abuse, depending on the food involved, may or may not lead to spoilage of the food and or growth of microorganisms of the food. The susceptibility of the food to temperature abuse depends on, at least in part how the food was preserved (if at all) and the natural characteristics of the food (e.g., the acidity of the food). Reducing, minimizing, or preventing the growth of pathogenic microorganisms is one focus of several embodiments of the methods described herein. Depending on the embodiment, a variety of different foods can be subjected to the in the preservation methods described herein. Some embodiments employ solid foods, semisolid foods. For example, some embodiments of the preservation methods are used to preserve cheese, canned food (e.g., vegetables, fruits, pastas, etc.), dairy products, butter, and the like. In several embodiments, the preservation methods are applied to liquids, such as, for example, syrups, vinegar, supplemented waters (e.g., fruit infused waters), wines, juices, and the like. In several embodiments, fruit juices are processed according to the methods disclosed herein. In several embodiments, fruit juices are preserved according to the methods disclosed herein. In several embodiments, vegetable juices are preserved according to the methods disclosed herein. In several embodiments, fruit-vegetable combination juices are preserved according to the methods disclosed herein.

In some embodiments, juices (whether fruit, vegetable, or combinations thereof) having a low acid (e.g., pH of greater than about 5, e.g., greater than 4.5, 4.6, 4.7, 4.8, 4.9, etc.) content particularly benefit from the preservation methods disclosed herein. This is because many pathogenic microorganisms cannot grow at low pH, but are viable, germinate, and produce spoilage byproducts (or toxins) at higher pH. For example, as discussed more below, *Clostridium botulinum* (a spore-forming bacterium) can be found on the surfaces of fruits and vegetable, and thus can be incorporated into juices during the fruit/vegetable processing. *C. botulinum,* because of its ability to exist as a spore, is capable of surviving several types of preservation, including HPP. While certain strains of *C. botulinum* cannot grow below a pH of about 4.6 (e.g., proteolytic strains), acidic foods may not be susceptible to growth of active or viable *C. botulinum* (as resultant toxin formation). However, foods with a higher pH may allow *C. botulinum* growth. For example, foods (including juices made from any of the following or combinations of two or more of the following) made from one or more of artichoke, asparagus, avocado, bananas, beets, broccoli, Brussels sprouts, cabbage, cantaloupe, carrots, cauliflower, celery, cilantro, clovers sprouts, coconut (flesh or milk), corn, cucumbers, dates, eggplants, fennel, fig, garlic, ginger, ginseng, greens (e.g., mixed greens), kale, leeks, lettuce (e.g., iceberg, romaine, red, etc.), mangoes, honeydew melon, okra, olives, papaya, parsley, parsnips, peas, radish, spinach, squash, Swiss chard, turnip, watermelon, wheat grass, and/or zucchini are likely to have a pH greater than about 4.6, and as such, may allow *C. botulinum* growth. In several embodiments, the foods may further comprise one or more of, grains, algae, cyanobacterium, or byproducts or components thereof. In several embodiments, other foods, such as for example, avocado, guacamole, sprouts (e.g., alfalfa sprouts, bean sprouts, deli meats, and/or hot dogs may allow *C. botulinum* growth. As discussed above, in the event of temperature abuse of such foods, the risk of *C. botulinum* spore germination and cellular growth and toxin production is increased.

For example, carrot juice has a pH of about 6.2, and in some cases, may be susceptible growth of *C. botulinum*, for example, in the event of temperature abuse of carrot juice, the low acidity may result in *C. botulinum* spore germination and or cellular growth and toxin production.

Even certain fruits or vegetables (or combinations thereof) that are relatively acidic, if combined with non-acidic fruits, vegetables (or combinations thereof), can result in a food product that has a pH higher than about 4.6. For example, combination of lime juice with a variety of other low acid fruit or vegetable juices can result in a juice having a pH greater than 4.6 (based on dilution of the acidic hydrogen ions from the lime juice). In contrast many citrus juices have relatively high acid content (e.g., low pH). As a result certain citrus juices are less susceptible to adverse bacterial growth In several embodiments, the food treated with the methods disclosed herein comprises carrot juice. In several embodiments, the food treated with the methods disclosed herein comprises carrot juice in combination with one or more fruit and/or vegetable having a pH greater than about 4.6.

In several embodiments, the food treated with the methods disclosed herein comprises juice from one or more of carrots, celery, beet, lime, ginger, apple, lemon, spinach, and parsley.

In several embodiments, the food treated with the methods disclosed herein comprises juice from one or more of carrots, celery, beet, ginger, apple, lemon, spinach, and parsley.

In several embodiments, the food treated with the methods disclosed herein comprises juice from one or more of celery, cucumber, parsley, lemon, wheat grass, apple, spinach, romaine lettuce, lime and clover.

In several embodiments, the food treated with the methods disclosed herein comprises juice from one or more of celery, cucumber, parsley, lemon, wheat grass, apple, spinach, romaine lettuce, and clover.

In several embodiments, the food treated with the methods disclosed herein comprises juice from one or more of celery, spinach, romaine lettuce, clover, cucumber, lime and wheat grass.

In several embodiments, the food treated with the methods disclosed herein comprises juice from one or more of celery, spinach, romaine lettuce, clover, cucumber, and wheat grass.

In several embodiments, the food treated with the methods disclosed herein comprises a beverage comprising juice and/or pulp of one or more of orange, apple, raspberry, *chlorella*, barley grass, mango, pineapple, sprirulina, wheat grass and dulse.

In several embodiments, the food treated with the methods disclosed herein comprises a beverage comprising juice and/or pulp of one or more of orange, apple, pineapple, and mango.

In several embodiments, the food treated with the methods disclosed herein comprises a beverage comprising juice and/or pulp of one or more of apple, blueberry, raspberry, banana, mango, strawberry, and coconut.

In several embodiments, the food treated with the methods disclosed herein comprises a beverage comprising juice and/or pulp of one or more of mango, orange, banana, apple, and coconut.

In several embodiments, the food treated with the methods disclosed herein comprises juice from one or more of pineapple, ginger, and cucumber.

In several embodiments, the food treated with the methods disclosed herein comprises juice from one or more of orange, carrot, and mango.

The juices described above, as well as other foods described herein, are treated in some embodiments, as follows:

(1) Fresh fruits, vegetables and/or other foods are ground to release their juices (or extracts);

(2) The juice (or liquid portion) is then extracted (e.g., separated) from the fibrous portions of the fruits and/or vegetables;

(3) The extracted juice is cooled to a temperature of about 38 to 42° F.;

(4) The extracted juice to conveyed to storage/mixing vessels and biocontrol microorganisms (e.g., *lactobacillus casei*) are added to the extracted juice at a inoculation concentration of between about 1000 CFU/gram to about 100,000,000 CFU/gram, including between about 1000 CFU/gram to about 5,000 CFU/gram, about 5,000 CFU/gram to about 10,000 CFU/gram, about 10,000 CFU/gram to about 20,000 CFU/gram, about 20,000 CFU/gram to about 50,000 CFU/gram, about 50,000 CFU/gram to about 100,000 CFU/gram, about 100,000 CFU/gram to about 200,000 CFU/gram, about 200,000 CFU/gram to about 300,000 CFU/gram, about 300,000 CFU/gram to about 500,000 CFU/gram, about 500,000 CFU/gram to about 750,000 CFU/gram, about 750,000 CFU/gram to about 1,000,000 CFU/gram, about 1,000,000 CFU/gram to about 2,500,000 CFU/gram, about 2,500,000 CFU/gram to about 5,000,000 CFU/gram, about 500,000, CFU/gram to about 1,000,000 CFU/gram, (5) The inoculated juice is then bottled and optionally passed through a metal detector (in order to identify any metallic contaminants);

(6) The inoculated juice is processed by HPP with a dwell time of about 30-200 seconds (e.g., about 180 seconds) and pressure of about 55,000-150,000 PSI (e.g., about 87,000 PSI); and (7) The processed juice is then moved to refrigerated storage conditions.

Methods

In several embodiments, the methods disclosed herein address foods that have been subjected to thermal abuse by providing non-pathogenic microorganisms that prevent growth and/or activity of pathogenic microorganisms. As discussed above, the non-pathogenic microorganisms, when introduced into a food product contaminated with pathogenic microorganisms alter the environment (e.g., acid-base balance of the food) in a manner that generates conditions that are adverse to pathogenic microorganisms. For example, in several embodiments the non-pathogenic microorganisms, by virtue of their metabolic function, produce lactic acid, which reduces the pH (increases the acid content) of the food and inhibits the growth and/or activity of certain pathogenic microorganisms (e.g., *C. botulinum*). Thus, the methods and disclosed herein are of particular importance in certain beverages having a naturally low acid content (e.g., higher pH).

In several embodiments, biocontrol, as disclosed herein, is used alone to control growth and/or activity of pathogenic microorganisms. In several embodiments, biocontrol is in combination with one or more food preservation methods to control growth and/or activity of pathogenic microorganisms. For example, in several embodiments, biocontrol is used with pasteurization. In several embodiments, biocontrol is used with HPP. In several embodiments, biocontrol is used in conjunction with cold storage and/or HPP.

In several embodiments, the methods disclosed herein result in a reduction in the pH to a level less than about 4.6 (the pH at which *C. botulinum* is inhibited). Depending on the amount of contamination with pathogenic microorganisms, achieving a pH at or around 4.6 also inhibits the growth or activity of certain pathogenic microorganisms. For example, in several embodiments, a pH of about 5.0 results in at least some inhibition of pathogenic microorganisms. In several embodiments, a pH of about 4.9 about 4.8, about 4.7, about 4.6 (or lower, and pH values in between those listed) is suitable for inhibition, at least in part, of the growth and/or activity of certain pathogenic microorganisms.

Depending on the embodiments, the target time for reduction of the pH of a food to a pH range that is sufficient to reduce and/or inhibit the growth and/or activity of pathogenic microorganisms (such as, for example, *C. botulinum*) is between about 1 to about 25 days (starting from the inception of temperature abuse). Depending on the embodiment, and the degree of temperature abuse, the target time to a pathogenic microorganism-inhibiting pH range is between about 1 and about 2 days, between about 2 to about 3 days, between about 3 and about 4 days, between about 4 and about 6 days, between about 6 and about 8 days, between about 8 and about 10 days, between about 10 and about 15 days, between about 15 and about 20 days, between about 20 and about 25 days, and overlapping ranges thereof. Again, in foods that may be particularly susceptible to contamination with pathogenic microorganisms, the initial inoculum of non-pathogenic microorganisms can be readily adjusted to reduce the time required to achieve the target pH range.

A variety of fruits and/or vegetables that have a low acid content are also characterized by having relatively high concentrations of nitrate and/or nitrite. Under the proper conditions, nitrate undergoes a reduction reaction (catalyzed by microorganisms, such as certain of the non-pathogenic microorganisms disclosed herein) to generate nitrite, which is known to have inhibitory effects on the viability and/or activity of certain pathogenic microorganisms, such as, for example, *C. botulinum*. Thus, in certain embodiments, the combination of biocontrol microorganism reduction in pH and nitrite content reduces and/or inhibits the viability and/or activity of pathogenic microorganisms such as *C. botulinum*. In several embodiments, vegetables having very high (e.g., ~2000-2500 mg/kg of fresh vegetable) nitrate and/or nitrite concentrations are present in the food products subjected to the biocontrol methods disclosed herein, such as, for example, beetroot and beetroot juice, celery, lettuce, rocket, spinach. In several embodiments, vegetables having high (e.g., ~1000-2000 mg/kg of fresh vegetable) nitrate and/or nitrite concentrations are present in the food products subjected to the biocontrol methods disclosed herein, such as, for example, Chinese cabbage, celeriac, endive, leek, parsley, kohlrabi. In several embodiments, vegetables having moderate (e.g., ~500-1000 mg/kg of fresh vegetables) nitrate and/or nitrite concentrations are present in the food products subjected to the biocontrol methods disclosed herein, such as, for example, cabbage, dill, turnips, carrot. In several embodiments, vegetables having low (e.g., ~200-500 mg/kg of fresh vegetable) nitrate and/or nitrite concentrations are present in the food products subjected to the biocontrol methods disclosed herein, such as, for example, broccoli, cauliflower, cucumber, pumpkin. In several embodiments, vegetables having very low (e.g., less than ~200 mg/kg of fresh vegetable) nitrate and/or nitrite concentrations are present in the food products subjected to the biocontrol methods disclosed herein, such as, for example, asparagus, artichoke, broad beans, green beans, peas, *capsicum*, tomato, watermelon, tomato, sweet potato, potato, garlic, onion, eggplants, mushroom, and combinations thereof. Combinations of vegetable with varying levels of nitrate and/or nitrite are also used, depending on the embodiment. Thus, depending on the embodiment, the combination of acid reduction and the increase of nitrite concentration by the non-pathogenic microorganisms function in combination to reduce the growth and/or activity of the pathogenic microorganisms. However, in several embodiments, nitrate and/or nitrite content are not a consideration in the contents of a food product subject to the biocontrol methods disclosed herein.

Biocontrol Process Flow

Figure 9:
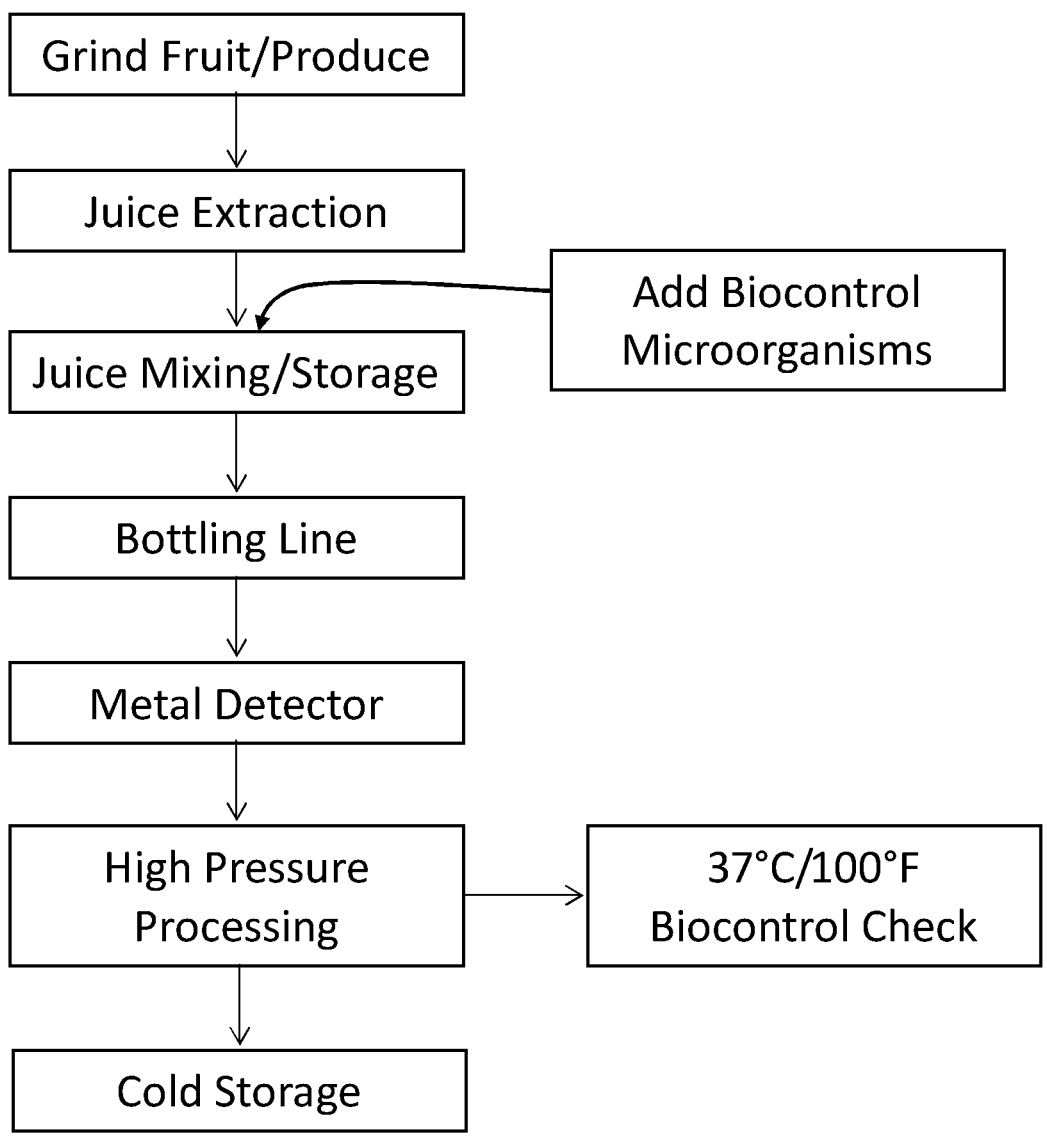
FIG. 9 is a schematic depicting biocontrol processing of juice according to several embodiments disclosed herein.

FIG. 9 presents a schematic of one embodiment of a biocontrol process flow protocol. Not all of the steps need be performed, nor need all the steps be performed in the order presented.

In several embodiments, the process begins with the selection and processing (e.g., grinding) of fruits, vegetables, combinations thereof (and optionally one or more of, grains, algae, cyanobacterium, or byproducts or components thereof). Juice is extracted from the processed components and delivered to a storage container and/or mixing container. In several embodiments, the non-pathogenic biocontrol microorganisms are added at this stage. The juice is inoculated with amounts such that at least a portion of the added microorganisms survive the later processing steps. For example, in several embodiments, the population surviving the later HPP steps ranges from about $1 \times 10^2$ to about $1 \times 10^4$ CFU/gram of food product, including about $2 \times 10^2$, about $6 \times 10^2$, about $3 \times 10^3$, about $5 \times 10^2$, about $7 \times 10^3$, and concentrations there between. Achieving these surviving concentrations, depending on the embodiments, employs initial inoculums from between about $5 \times 10^2$ to about $1 \times 10^8$ CFU/gram, including about $5 \times 10^2$, about $6 \times 10^2$, about $7 \times 10^2$, about $8 \times 10^2$, about $9 \times 10^2$, about $1 \times 10^3$, about $2 \times 10^3$, about $3 \times 10^3$, about $4 \times 10^3$, about $5 \times 10^3$, about $6 \times 10^3$, about $7 \times 10^3$, about $8 \times 10^3$, about $9 \times 10^3$, about $1 \times 10^4$, about $2 \times 10^4$, about $4 \times 10^4$, about $6 \times 10^4$, about $8 \times 10^4$, about $1 \times 10^5$, about $2 \times 10^5$, about $4 \times 10^5$, about $6 \times 10^5$, about $8 \times 10^5$, about $1 \times 10^6$, about $5 \times 10^6$, about $1 \times 10^7$, about $5 \times 10^7$, about $1 \times 10^8$, and concentrations there between.

In several embodiments, the inoculated juice is then bottled using established methods and is optionally run through a metal detector (prior to HPP).

After addition of lactic acid producing microorganisms and bottling, the inoculated juice is subjected to high pressure processing (HPP) according to several embodiments. HPP is configured to reduce target microorganisms (e.g., those most likely to be present in the food, such as *E. coli, Salmonella* sp., *Lysteria monocytogenes*, and combinations thereof) by at least 5 log in some embodiments. In several embodiments, HPP employs pressures ranging from about 70,000 PSI to about 90,000 PSI, including about 70,000 PSI to about 75,000 PSI, about 75,000 PSI to about 80,000 PSI, about 80,000 PSI to about 85,000 PSI, about 85,000 PSI to about 87,000 PSI, about 87,000 PSI to about 88,000 PSI, about 88,000 PSI to about 90,000 PSI, and overlapping ranges thereof. The dwell time of HPP (the time that the pressure is maintained) is variable, depending on the embodiment. For example, in several embodiments, the dwell time is about 30 seconds. In several embodiments, the dwell time is between about 30 seconds and about 90 seconds. In several embodiments, however, the dwell time is about 180 seconds. In other embodiments, the dwell time ranges from about 30 seconds to about 60 seconds, about 60 seconds to about 100 seconds, including about 100 seconds to about 150 seconds, about 150 seconds to about 200 seconds, about 200 seconds to about 250 seconds, about 250 seconds to about 300 seconds, and overlapping ranges thereof.

Advantageously, HPP imparts little heat transfer to the food product and thereby maintains nutrient stability and preventing off-taste side effects. In several embodiments, the methods herein result in less than about 15 to about 20° F. increase in temperature of the food product (e.g., from about 32° F. post-inoculation to less than about 47 to 52° F. during HPP). Thus, in several embodiments the temperature of the food product during the biocontrol process flow is maintained between about 32 about 52° F., including about 32 to about 35° F., about 35 to about 38° F., about 38 to about 41° F., about 41 to about 43° F., about 43 to about 46° F., about 46 to about 49° F., about 49 to about 51° F., and overlapping ranges thereof.

After HPP, the juice can optionally be tested for its biocontrol potential. In such embodiments, selected samples from a juice production run are subjected to a 100° F. temperature abuse (e.g., the temperature of the juice is held at 100° F.) and the pH is measured after about 48 hours. The threshold pass for this optional test is a reduction of the pH of the juice to less than about pH 4.6 within that 48 hour period. Achieving that pH reduction within that time frame indicates that a batch of juice has suitable biocontrol potential. A failure to achieve that pH reduction can either result in discarding of that batch of juice or further analysis of the biocontrol potential of the juice batch.

After HPP, the juice is stored under cold storage conditions, such as for example between about 35 and 42° F. (except for those samples optionally subjected to the optional biocontrol potential test described above). Advantageously, the methods disclosed herein address the industry recognized need to control growth and/or activity of pathogenic microorganisms, but do so without use of exogenous acidification of the juice or heat pasteurization, both of which alter the taste and/or nutrient profile of the food.

Moreover, in several embodiments, the methods reduce spoilage and increase shelf life of fresh juices and in some cases impart probiotic health benefits to the consumer of the food (depending on the microorganisms utilized in a particular embodiment). Also, unexpectedly, the processes disclosed herein allow the inoculated juice to be optionally (including accidentally) frozen and rethawed without significant degradation of the biocontrol potential of the juice. This is surprising given that a freeze-thaw cycle can compromise the viability and/or loss metabolic activity of many microorganisms. However, in several embodiments, a fresh juice can optionally be frozen (e.g., by a consumer) and once taken out of freezing temperatures, if subjected to temperature abuse, is still protected by the biocontrol microorganisms. This is beneficial in many contexts, such as, for example, a consumer may wish to consume a fruit and/or vegetable juice in the future (e.g., later that day) but knows that no source of refrigeration would be available. Thus, in such a situation, the fruit and/or vegetable juice could be frozen, removed from the freezer, and transported under non-refrigerated conditions (the temperature increase of the juice would be delayed as the juice would need to first thaw). If, during that unrefrigerated time period, the temperature of the juice was increased to a level considered temperature abuse, the biocontrol microorganisms would, as disclosed herein, produce acid and reduce, prevent, or otherwise inhibit the viability and/or activity of pathogenic microorganisms (e.g., *C. Botulinum*) that may have been present in the juice.

EXAMPLES

The examples provided below are intended to be non-limiting embodiments of the invention.

Example 1

Non-pathogenic Lactic Acid-producing Microorganisms for Use in Biocontrol

Survey of Biocontrol Microorganisms

Several embodiments of the methods disclosed herein are directed to the use of non-pathogenic microorganisms to prevent or reduce the growth and/or activity of pathogenic microorganisms in a food product subject to temperature abuse. In particular, certain foods with a low acid content may be particularly susceptible to growth and activity of pathogenic microorganisms (e.g., *C. Botulinum*).

The experiments below evaluated the characteristics of a variety of *Lactobacillus* species that, when added to (for example) a low acid juice such as carrot juice or a fruit/vegetable juice with a pH greater than about 5 prior to HPP (the HPP conditions configured to achieve at least a 5 log reduction in pathogens such as *E. coli, Salmonella* sp, *Lysteria monocytogenes*) a sufficient quantity of *Lactobacillus* remains viable; sufficient being operationally defined as:
(i) if the juice is temperature abused (e.g., exposed to temperatures above about 40° F. the remaining *Lactobacillus* have the ability to drop the pH below about 4.6 before pathogenic *Clostridium botulinum* can grow (e.g., biocontrol); and
(ii) if the product is not temperature abused (e.g. stored at 40° F. or lower), the remaining *Lactobacillus* do not grow and the food product is unchanged (e.g., with respect to its pH).

Thus, the bacteria that meet these criteria (e.g., the combination of biocontrol and HPP) meet the FDA guidelines for assuring the safety of low acid refrigerated juices to thermal abuse. Advantageously, this is achieved, in several embodiments, without the need for exogenous pH adjustment which can adversely affect the flavor of the juice.

High pressure processing, also known as HPP is effective at killing pathogens, such as *E. coli, Salmonella* sp and *Lysteria monocytogenes*. HPP is also known to have some diversity in effectiveness in killing different types (genus and/or species) of microorganisms as compared to thermal pasteurization. In other words, some varieties of microorganism are more resistant to HPP as compared to others. As discussed above, certain non-pathogenic microorganisms (e.g., spores) are resistant to HPP. Advantageously, it has been discovered that certain non-pathogenic microorganisms are relatively resistant to HPP. For example, certain microorganisms from the genus Lactobacilli which are homo-fermentative (Group 1) are relatively resistant to HPP. One non-limiting example of a homo-fermentative *lactobacillus* is *Lactobacillus acidophilus* (also recognized as a probiotic). Other non-limiting examples of Group 1 Lactobacilli include *L. acidophilus, L. delbrueckii, L. helveticus, L. salivarius*, among others. Surprisingly, not all homo-fermentive lactic acid bacteria are equally as robust at surviving HPP, thus, in several embodiments, other types of Lactobacilli (e.g., hetero-fermentative) are used in several embodiments.

Various *Lactobacillus* strains were evaluated for their ability to survive various HPP conditions. A brief summary of the characteristics of each species screened, the results of the screening, and the HPP conditions used are summarized in Table 1.

TABLE 1

Non-pathogenic Microorganisms and HPP Survival

| Microorganism | Type | Juice | HPP Dwell time (sec) | HPP Pressure (PSI) | Log reduction |
|---|---|---|---|---|---|
| Control | N/A | Vegetable | 90 | 87K | 3.3 |
| Control | N/A | Vegetable | 180 | 87K | 1.8 |
| Lactobacillus casei strain 1 | Fac Hetero | Vegetable | 180 | 87K | 3.1 |
| Lactobacillus casei strain 2 | Fac Hetero | Vegetable | 180 | 87K | 1.0 |
| Pediococcus acidilactici strain #1 | Homo | Vegetable | 90 | 87K | −0.6 |
| Pediococcus acidilactici #2 | Homo | Vegetable | 90 | 87K | −0.4 |
| Pediococcus acidilactici #1 | Homo | Vegetable | 180 | 87K | 2.4 |
| Lactobacillus rhamnosus | Homo | Vegetable | 180 | 87K | 3.0 |
| Lactobacillus paracasei | Fac Hetero | Vegetable | 180 | 87K | 3.5 |
| Lactobacillus paracasei | Fac Hetero | Vegetable | 180 | 87K | 2.6 |
| Lactobacillus acidophilus | Homo | Vegetable | 90 | 87K | 3.1 |
| Lactobacillus lactis lactic | Homo | Vegetable | 90 | 87K | 6.5 |
| Lactobacillus helveticus Strain #1 | Homo | Vegetable | 90 | 87K | 0.4 |
| Lactobacillus helveticus Strain #2 | Homo | Vegetable | 90 | 87K | 3.0 |
| Lactobacillus helveticus Strain #3 (microencapsulated) | Homo | Vegetable | 90 | 87K | 5.0 |
| Lactobacillus helveticus Strain #1 | Homo | Vegetable | 180 | 87K | 2.4 |

These results indicated that several microorganism survive HPP (30-200 seconds at about 87,000 psi) with minimal or no reduction in number as compared to the initial inoculum. For example, at a 90 second dwell time, Pediococcus acidilactici (a cocci) showed essentially no reduction at all and Lactobacillus casei (a rod) showed only a one log reduction. Moreover, unexpectedly, microorganisms other than homo-fermentative lactic acid bacteria were resistant to HPP. Thus, in several embodiments homo-fermentive lactic acid bacteria are used, while in other embodiments, hetero-fermentive lactic acid bacteria, surprisingly, are HPP resistant and are used. These data also indicated that microencapsulation provided some added resistance to HPP. Thus, in several embodiments, microencapsulated lactic acid bacteria are optionally used.

Efficacy of Biocontrol Microorganisms after Temperature Abuse

Experiments were designed to evaluate the efficacy of the various strains of microorganisms that show relatively good resistance to HPP at reducing the pH of a low acid juice when exposed to non-refrigerated temperatures. Initially, several bottles of control juice and several bottles of inoculated juice were stored a ~50° F. and ~70° F. in order to determine time-points for testing the pH of juice post-HPP. It was discovered, however that an endogenous microorganism was present in the control juice samples that was surviving HPP, producing gas ($CO_2$) and dropping the pH to less than 4.6 after about 3 days at 70° F. DNA analysis indicated that the microorganisms were a mixture of a hetero-fermentative lactic acid bacteria (Leuconostoc lactis) and a Propionibacterium.

Experiments were designed to assess the efficacy of various HPP resistant microorganisms at various inoculation levels. Raw carrot juice was used as the low acid juice for these experiments, though as discussed above, biocontrol can be used with a variety of other low acid fruit and/or vegetable juices. Two strains showing good resistance to HPP were selected as examples of those that could be used in the methods disclosed herein, Pediococcus acidilactici and Lactobacillus casei. Two inoculation levels (estimates of what biocontrol microorganisms would be present in juice post-HPP) were used, namely, $5 \times 10^2$ and $5 \times 10^4$ CFU/gram. Total microorganism counts were performed before HPP and then HPP (90 seconds at 87K PSI) were performed and samples were analyzed for post-HPP counts of biocontrol microorganisms, pH and dissolved oxygen over time at 70° F. These experiments were also performed using carrot juice that was subjected to 5 minutes of HPP prior to inoculation with biocontrol microorganisms, in order to distinguish what effects were from endogenous microorganisms and what was due to the inoculated biocontrol microorganisms. In several embodiments the methods disclosed herein are particularly useful for satisfying the positive regulatory steps to ensure safety of low acid juices (and other foods). The presence of endogenous microorganisms may, by chance, assist in lowering pH (or otherwise inhibiting pathogen growth); however the use of exogenous microorganisms as disclosed herein satisfies certain regulatory requirements for safety in low acid foods, particularly low acid juices.

When raw carrot juice was used as the starting material, it was determined that acid production (pH drop) occurred in control samples (see Table 2 and FIG. 1) as well as samples from juice inoculated with biocontrol microorganisms. Of note is a lag phase or between about 1 to about 3 days during which pH is not substantially affected. The lag phase is a result of the time required for the biocontrol microorganisms to become metabolically active and to produce enough lactic acid to overcome any buffering effect innate in the juice (or other food). In several embodiments, the lag phase varies based on the temperature of the juice (or other food). For example, if the food is raised to a temperature of about 70° F.-72° F., the lag phase is relatively short, while foods raised to lower temperatures (e.g., 44-50° F.) have longer lag phases. In several embodiments, this is advantageous, as the more severe the temperature abuse, the more rapidly the biocontrol microorganisms become active, and the more quickly the pH is reduced. When carrot juice subjected to 5 minutes of HPP prior to inoculation with biocontrol microorganisms was used as the starting material, it was determined that acid production (pH drop) also occurred in control samples (see Table 3 and FIG. 1) as well as samples from juice inoculated with biocontrol microorganisms. Dissolved oxygen concentrations were also low in the samples (data not shown) indicating that conditions for sporulation of *C. botulinum* are present (*C. botulinum* is only able to produce the neurotoxin during sporulation, which can only happen in a low-oxygen and/or anaerobic environment).

Efficacy of Biocontrol after Temperature Abuse at Varied Temperatures

As discussed above, temperature abuse occurs, when the temperature of a food (e.g., a low acid content juice) is elevated to a temperature that allows the growth of certain pathogenic microorganisms. As discussed above, certain strains of *C. botulinum* can grow at lower temperatures (e.g., about 50° F.) while other strains grow at higher temperatures (e.g., about 70° F.). Thus, the experiments described below were designed to further corroborate the results discussed above, and identify non-pathogenic biocontrol microorganisms that are functional over a variety of temperatures.

TABLE 2

HPP Effects on Endogenous and Biocontrol Microorganisms in Raw Carrot Juice

| Microorganism | Inoculation (CFU/gram) | Initial Count | HPP Time (sec) | Post-HPP Count | Log Reduction |
| --- | --- | --- | --- | --- | --- |
| Control | n/a | $1.4 \times 10^3$ | 90 | $3.0 \times 10^1$ | 1.7 |
| *P acidilactici* Strain #1 | $5 \times 10^2$ | $1.2 \times 10^3$ | 90 | $2.3 \times 10^2$ | 0.7 |
| *P acidilactici* Strain #1 | $5 \times 10^4$ | $1.0 \times 10^5$ | 90 | $2.2 \times 10^6$ | −1.3 |
| *P acidilactici* Strain #2 | $5 \times 10^2$ | $1.4 \times 10^3$ | 90 | $2.2 \times 10^2$ | 0.8 |
| *P acidilactici* Strain #2 | $5 \times 10^4$ | $>1.0 \times 10^5$ | 90 | $>1.0 \times 10^5$ | ~0 |
| *L casei* Strain #1 | $5 \times 10^2$ | $1.6 \times 10^3$ | 90 | $2.0 \times 10^1$ | 1.9 |
| *L casei* Strain #1 | $5 \times 10^4$ | $>1.0 \times 10^5$ | 90 | $>1.0 \times 10^5$ | ~0 |
| *L casei* Strain #2 | $5 \times 10^2$ | $1.1 \times 10^3$ | 90 | $9.7 \times 10^1$ | 1.0 |
| *L casei* Strain #2 | $5 \times 10^4$ | $>1.0 \times 10^5$ | 90 | $>1.0 \times 10^5$ | ~0 |

TABLE 3

HPP Effects on Endogenous and Biocontrol Microorganisms in HPP-pretreated Carrot Juice

| Microorganism | Inoculation (CFU/gram) | Initial Count | HPP Time (sec) (pre-inoculation/ post-inoculation) | Post-HPP Count | Log Reduction |
| --- | --- | --- | --- | --- | --- |
| Control | n/a | $1.2 \times 10^3$ | 300/90 | $<1.0 \times 10^1$ | >2.1 |
| *P acidilactici* Strain #1 | $5 \times 10^2$ | $1.2 \times 10^3$ | 300/90 | $2.3 \times 10^2$ | 0.7 |
| *P acidilactici* Strain #1 | $5 \times 10^4$ | $1.0 \times 10^5$ | 300/90 | $2.2 \times 10^6$ | −1.3 |
| *L casei* Strain #2 | $5 \times 10^2$ | $4.3 \times 10^2$ | 300/90 | $<1.0 \times 10^1$ | 1.6 |
| *L casei* Strain #2 | $5 \times 10^4$ | $>1.0 \times 10^5$ | 300/90 | $>1.0 \times 10^5$ | ~0 |

These data indicate that, while some endogenous microorganism are present in carrot juice, a 5 minute HPP exposure did not sterilize the carrot juice (e.g., endogenous microorganisms remained). The endogenous microorganisms, as well as the inoculated microorganisms reduced the pH to <4.6 in ~5 days at 70° F. (see FIG. 1). However, as endogenous microorganisms may not always be present in carrot juice, may be present at different levels in various batches of carrot juice (e.g., batch to batch, manufacturer to manufacturer, and or variable across geographic regions carrots sourced from) and may not be present at all in other low acid juices, inoculation with biocontrol microorganisms is still an important process for safety of consumers. As shown in Table 2 and 3, biocontrol microorganisms inoculated into carrot juice not only survive HPP, they reduce the pH to less than 4.6 (see FIG. 1) when exposed to temperature abuse (as an example of severe temperature abuse, 70° F.). Thus, in several embodiments, lactic acid producing microorganisms, either alone in or in combination with a food preservation technique (e.g., HPP) are used to reduce the pH of a naturally low acid juice, when that juice is exposed to non-refrigerated temperatures. In several embodiments, *P. acidilactici* is used. In several embodiments, *L. casei* is used. Combinations may also be used, depending on the embodiment. Moreover, in several embodiments, inoculated biocontrol according to the methods disclosed herein is used to supplement certain endogenous microorganisms (should they be present).

Experiments were performed generally as described above (see also FIG. 9 for a schematic process flow). In brief, juice was prepared and extracted (in these experiments a non-limiting example of a low-acid juice made from celery, cucumber, spinach, lime, romaine, wheat grass, and clover, was used). Upon extraction, various non-pathogenic biocontrol microorganisms were added to the juice at a concentration of between about 100,000 to 5,000,000 CFU/gram of juice. These experiments employed (as non-limiting examples of non-pathogenic microorganisms for use in biocontrol) *lactobacillus casei* (two strains from different suppliers) and *pediococcus acidilactici*, as these microorganisms showed promising results in surviving HPP and reduction of pH in carrot juice (above). Inoculated juice was then bottled and subjected to HPP (180 second dwell time at 87K PSI; conditions known to satisfy the FDA guidelines for a 5-log reduction in certain target pathogens). As discussed above, various other HPP configurations may be used, depending on the embodiment. For example, the following non-limiting HPP configurations can be used: pressure of approximately 75,000-100,000 PSI (e.g., about 87,000 PSI) and a dwell time of approximately 30-300 seconds (e.g., 180 seconds). Moreover, in several embodiments, other food preservation techniques, in addition to, or in place of HPP may be used with biocontrol. Juices (now bottled as they would be at a manufacturer) were stored at various temperatures (70-72° F., 50-52° F., or standard storage temperatures of ~42° F.) for various time periods. Samples were collected at intervening time points and evaluated for pH.

Results of exposure to severe temperature abuse (e.g., juice temperature of 70-72° F.) are shown in FIG. 1. As shown, juice inoculated with *lactobacillus casei* or *pediococcus acidilactici* reduced the pH from an initial value of about 6.2 (the natural pH of the juice) to a pH of less than about 4.6 in ~3 days. Control samples (no exogenous bacteria) also dropped the pH, but on a delayed time frame. Thus, in several embodiments, use of biocontrol microorganisms in juices subject to exposure to temperature abuse become metabolically active and reduce the pH to levels below which pathogenic microorganisms, such as *C. botulinum*, are inactivated (or have their viability and/or activity reduced). As such, production of the toxins (or other harmful products) produced by pathogens is reduced, minimized, and/or prevented.

Results of exposure to temperature abuse (e.g., juice temperature of 50-52° F. for 25 days) are shown in FIG. 2. As shown, juice inoculated with *lactobacillus casei* strain #1 reduced the pH from an initial value of about 6.2 (the natural pH of the juice) to a pH of about 5 in approximately 7 days and to less than about 4.6 in approximately 10 days. The other *lactobacillus casei* strain and *pediococcus acidilactici* achieved the reduction of pH to about 4.6 after approximately 20 days.

After storage at a typical cold storage temperature of 40-42° F., juice samples were evaluated for their taste characteristics and microorganisms content. This experiment serves to evaluate the effect of the microorganisms on juice in the absence of temperature abuse (e.g., the impact of biocontrol on the shelf life of the juice). Table 4 summarizes the data.

TABLE 4

Microorganism Content of Juice Samples

| | *L. casei* | | *P. acidilactici* | |
|---|---|---|---|---|
| Days at 40-42° F. | pH | Microorganism Amount (CFU/g) | pH | Microorganism Amount (CFU/g) |
| 3 | 6.1 | $2.0 \times 10^2$ | 6.1 | $2.7 \times 10^4$ |
| 11 | 6.1 | $1.0 \times 10^2$ | 6.1 | $4.4 \times 10^3$ |
| 13 | 6.0 | $1.0 \times 10^2$ | 5.9 | $3.7 \times 10^3$ |
| 18 | 6.1 | $1.0 \times 10^2$ | 6.1 | $3.7 \times 10^3$ |
| 20 | 6.0 | $1.0 \times 10^2$ | 6.0 | $2.0 \times 10^3$ |
| 25 | 6.0 | $2.0 \times 10^2$ | 6.0 | $1.2 \times 10^3$ |
| 27 | 6.0 | $2.0 \times 10^2$ | 6.0 | $1.2 \times 10^3$ |
| 32 | 5.9 | $5.3 \times 10^3$ | 5.9 | $1.1 \times 10^3$ |
| 34 | 6.1 | $4.3 \times 10^4$ | 6.0 | $6.0 \times 10^2$ |
| 41 | 6.2 | $2.2 \times 10^3$ | 6.2 | $3.0 \times 10^4$ |
| 46 | 5.8 | $3.0 \times 10^4$ | 5.9 | $5.0 \times 10^2$ |

With respect to the flavor profiles, no alterations were detected in flavor after 32 days of storage at 40-42° F. Bitterness became noticeable by day 34, and taste was unpalatable at day 42. However, as demonstrated by the relatively steady pH over time in juices inoculated by either *L. casei* or *P. acidilactici*, this change in taste does not appear to be due to acid production by the biocontrol microorganisms. It may represent the natural shelf life of the juice. Moreover, the steady pH demonstrates that these microorganisms, as examples of those for use in biocontrol, do not reduce the pH in the absence of temperature abuse.

Additional experiments were performed to further elucidate the efficacy and reproducibility of biocontrol under various temperature abuse conditions. For example, a study was performed in which 5 independent juice production runs were tested. Each run employed a separate production batch of biocontrol microorganisms (*L. casei* was used as a non-limiting example of a biocontrol microorganism) at an inoculation concentration of ~5,000,000 CFU/gram of juice. The following temperature abuse conditions (e.g., juices held at the following temperatures) were tested:

1. 70-72° F.
2. 70-72° F. after a 3 week hold at 40° F.
3. 50-52° F.
4. 44-46° F.

pH was measured in replicate samples for each of the five trials. Also, as described above, a standard sensory shelf life test, including measuring the microorganism population and pH after storage at 42° F. Summary data from the five replicates of Trial #1 is shown in FIG. 3, with individual replicate data for one replicate trial (representative of 4 of the 5 trials) is shown in FIG. 4. One of the five individual replicate trials of temperature abuse condition #1 above failed to reduce the pH to below about 4.6 until about 6 days had passed (see FIG. 5). While the pH reduce did occur, in some embodiments, a more rapid reduction in pH is preferred. This is likely due to batch to batch variability of the biocontrol microorganisms (again each trial was run with an independent batch of biocontrol microorganism). However as discussed below, in several embodiments, a quality control test wherein refrigerated juice is abused at 100° F. with a target pH reduction to ~4.6 in less than 48 hours. Juice lots that fail to pass this quality control test would not be released, as the test results indicate that the biocontrol microorganisms are not sufficiently active to reduce the pH under less severe temperature abuse conditions. Thus, in several embodiments, even if other temperature abuse conditions suggest that a particular juice production run has sufficient biocontrol activity, a juice production run that fails the 100° F. temperature abuse quality control test would not be released. The juice sample that resulted in the data shown in FIG. 5 would have likely failed that test, and hence not have been released to consumers.

Data from individual trials for temperature conditions #2-#4 above are shown in FIG. 6, FIG. 7, and FIG. 8, respectively. These data demonstrate that, whether temperature abuse is severe and immediate (Trial condition #1), severe and after a period of normal storage (Trial condition #2), moderate (Trial condition #3), or mild (Trial condition #4), biocontrol microorganisms effectively reduce the pH to a level below 4.6 in a matter of days.

The duration required to reduce the pH is negatively correlated with the severity of the temperature abuse (e.g., less severe abuse requires more time to reduce the pH). This is likely due to the biocontrol microorganisms being less active at temperatures closer to normal refrigeration.

Biocontrol and Botulism Challenge

As discussed above, a primary pathogenic microorganism of concern is *C. botulinum*, as under temperature abuse conditions in a low acid juice, botulinum toxin could be produced, leading adverse events. A botulism challenge experiment was performed to establish the ability of the biocontrol methods disclosed herein to prevent the production of toxin.

The challenge study employed a cocktail of spores from 11 strains of *Clostridium botulinum*, which included both proteolytic and non-proteolytic strains, and two type F strains isolated from fish which are capable of growth at lower temperatures (e.g., juice temperatures less than 70-72° F. Juices were inoculated with ~1000 spores per gram of juice. *L. casei* was used as the biocontrol microorganism. Inoculated juice was incubated at about 40, 45, 50, 70 or 100° F. Non-inoculated juice served as a negative control, while a heat pasteurized (80° C. for 20 minutes, resulting in a sterilized juice) served as a positive control. A shelf life test (storage at 40° F.) was run for 1.5 times the shelf life determined above. Juice samples were tested for the presence of botulinum toxin, pH, lactic acid bacteria content, anaerobic and aerobic total counts, and amount of C. botulinum spores.

When juice was held at ~70° F., samples with L. casei reached a reduced pH of 4.22 by day 5. In contrast, control samples (no added L. casei) remained above pH 4.6 for 30 days. In juice samples that were sterilized (80° C./20 min), without addition of L. casei, the pH was measured at 6.11 @ day 30. When held at 50° F., juice with L. casei reached a reduced pH level of 4.19 by day 14. In contrast, sterilized juice with no added L. casei remained at a close to normal pH for 28 days (pH of 5.89 at day 28). Juice held at a temperature of 45° F. with added L. casei had a reduced pH of 4.37 by day 40, whereas sterilized juice with no added L. casei remained at a close to normal pH for 28 days (pH of 5.64 at day 28). Thus, in response to temperature abuse at various temperatures (e.g., the temperature of the juice, not just the environment in which the juice was held), juices with added L. casei (representative of one of many possible lactic acid producing bacteria for use in biocontrol) exhibit reduced pH that would be sufficient to inhibit, kill or otherwise negatively impact C. botulinum, and hence reduce the chance of ingestion of juice containing botulinum toxin. Also, when incubated at normal cold storage temperatures of ~40° F. juice with added L. casei remained at pH 6.01 on day 40 and pH 5.91 at day 60. These data confirm that the addition of biocontrol microorganisms not only functions to inhibit viability and/or growth of *C. botulinum* that could occur as a result of temperature abuse, but also do not reduce the pH of the juice when the juice is stored under proper cold storage temperature conditions.

Although the embodiments of the inventions have been disclosed in the context of a certain embodiments and examples, it will be understood that the present invention(s) extend beyond the specifically disclosed embodiments to other alternative embodiments and/or uses of the inventions and obvious modifications and equivalents thereof. It is also contemplated that various combinations or subcombinations of the specific features and aspects of the embodiments may be made and still fall within one or more of the inventions. Further, the disclosure herein of any particular feature, aspect, method, property, characteristic, quality, attribute, element, or the like in connection with an embodiment can be used in all other embodiments set forth herein. Accordingly, it should be understood that various features and aspects of the disclosed embodiments can be combined with or substituted for one another in order to form varying modes of the disclosed inventions. For all of the embodiments described herein the steps of the methods need not be performed sequentially. The methods disclosed herein include certain actions taken by a first party; however, they can also include any third-party instruction of those actions, either expressly or by implication. For example, actions such as "inoculating a food product with a population of microorganisms" include "instructing the inoculation of a food product with a population of microorganisms." Thus, it is intended that the scope of the invention(s) herein disclosed should not be limited by the particular disclosed embodiments described above, but to the contrary, the invention(s) is to cover all modifications, equivalents, and alternatives falling within the spirit and scope of the various embodiments described and the appended claims.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 10 seconds" includes "10 seconds."

What is claimed is:

1. A method of controlling the growth of pathogenic microorganisms in a low acid content food product, comprising providing a low acid content food product having a pH greater than 4.5;

inoculating said food product with a population of the microorganism *Lactobacillus casei rhamnosus* to generate an inoculated food product, wherein said inoculation results in a concentration of said microorganisms ranging from 10 to $10^7$ colony forming units (CFU)/gram of said food product, processing said inoculated food product using high pressure processing (HPP) to generate a stable food product, wherein at least a portion of said microorganisms remain viable after said HPP, wherein said stable food product is susceptible to a period of temperature abuse comprising elevation of the temperature of said stable food product to temperatures greater than 40° F., wherein the pH of the stable food product remains substantially unchanged if the stable food product is not exposed to said temperature abuse, wherein, if exposed to said temperature abuse, in response to said temperature abuse, said viable inoculated microorganisms grow and produce acid, wherein the acid produced reduces the pH of said stable food product to less than 4.5, and wherein said reduction in pH inhibits the viability and/or metabolic activity of pathogenic microorganisms, thereby controlling the growth of pathogenic microorganisms.

2. The method of claim 1, wherein said *Lactobacillus casei rhamnosus* comprises *Lactobacillus casei rhamnosus* from subspecies *rhamnosus* 842.

3. The method of claim 1, wherein said *Lactobacillus casei rhamnosus* comprises *Lactobacillus casei rhamnosus* having all the identifying characteristics of *Lactobacillus casei rhamnosus* 842 NRRL-B-15972.

4. The method of claim 1, wherein said temperature abuse comprises elevation of the temperature of said stable food product to temperatures to temperatures of 70° F. or greater for at least six hours and wherein said pH reduction occurs within 3 to 5 days from the inception of said temperature abuse.

5. The method of claim 1, wherein said temperature abuse comprises elevation of the temperature of said stable food product to temperatures of 50° F. to 55° F. and said pH reduction occurs within 8 to 12 days from the inception of said temperature abuse.

6. The method of claim 1, wherein said *Lactobacillus casei rhamnosus* are optionally encapsulated.

7. The method of claim 1, wherein said pathogenic microorganism is selected from the group consisting of *C. botulinum, C. butyricum, C. baratii, C. argentinense*, microorganisms from the genus *Salmonella*, microorganisms from the genus *Lysteria*, microorganisms from the genus *Leuconostoc*, microorganisms from the genus *Pediococcus*, and/or *E. Coli* and combinations thereof.

8. The method of claim 1, wherein said low acid food product comprises juice and/or pulp from one or more of carrots, celery, cucumber, beet, lime, ginger, apple, lemon, spinach, wheat grass, romaine lettuce, clover sprouts, orange, raspberry, chlorella, barley grass, mango, pineapple, spirulina, dulse, and parsley.

9. The method of claim 1, wherein the low acid content food product comprises a low acid content juice, wherein the low acid content juice has not been thermally pasteurized, wherein the low acid content juice has a pH between about 5.0 and about 6.5, wherein said low acid juice comprises juice from one or more of carrots, celery, beet, lime, ginger, apple, lemon, spinach, and parsley, wherein said HPP employs pressure of greater than about 80,000 pounds per square inch (PSI), and wherein said HPP processing results in an increase in temperature of said stable juice of less than 15 to 20° F.

10. The method of claim 1, wherein the generation of said stable food product further prevents the spoilage of said stable food product.

11. A method of controlling the growth of pathogenic microorganisms in a low acid content food product, comprising:
  processing fruit, vegetables, or combinations thereof to generate a low acid content food having a pH greater than 4.5;
  inoculating said low acid content food with a population of *Lactobacillus casei rhamnosus* microorganisms to generate an inoculated food product;
  processing said inoculated food product using high pressure processing (HPP) to generate a stable food product, wherein at least a portion of said *Lactobacillus casei rhamnosus* microorganisms remain viable after said HPP,
  wherein said stable food product is susceptible to a period of temperature abuse comprising exposure to temperatures greater than 40° F.,
  wherein the pH of the stable food product remains substantially unchanged if the stable food product is not exposed to said temperature abuse,
  wherein, if exposed to said temperature abuse, in response to said temperature abuse, said viable *Lactobacillus casei rhamnosus* microorganisms grow and produce acid, wherein the acid produced reduces the pH of said stable food product to less than 4.5,
  wherein said reduction in pH inhibits the viability and/or metabolic activity of pathogenic microorganisms, thereby controlling the growth of pathogenic microorganisms.

12. The method of claim 11, wherein said low acid content food comprises juice.

13. The method of claim 11, wherein said low acid content food comprises a smoothie.

14. The method of claim 11, wherein said low acid content food further comprises one or more of grains, algae, cyanobacterium, or byproducts or components thereof.

15. The method of claim 11, wherein said lactic acid producing microorganisms comprise *Lactobacillus casei* and wherein said pathogenic microorganisms comprises *C. botulinum, C. butyricum, C. baratii, C. argentinense*, or combinations thereof.

16. A method of controlling the growth of pathogenic microorganisms in a low acid content food product, comprising
  providing a low acid content food product having a pH greater than 4.6;
  inoculating said food product with between 10 to $10^7$ colony forming units (CFU)/gram of food product of a population of *Lactobacillus casei rhamnosus* microorganisms to generate an inoculated food product,
  exposing said inoculated food product to a pressure of greater than about 80,000 pounds per square inch (PSI) for between 30 and 200 seconds, with an increase in temperature of the inoculated food product of less than 15 to 20° F., thereby generating a stable food product,
  wherein, in response to elevation of the temperature of said stable food product to temperatures greater than 40° F., said inoculated microorganisms grow and produce acid to reduce the pH of said stable food product to inhibit the viability and/or metabolic activity of pathogenic microorganisms, and
  wherein the inoculated microorganism do not reduce the pH of the of the stable food product to 4.6 or below if the temperature of the stable food product is not elevated to above 40° F.

17. The method of claim 16, wherein the low acid food product comprises a low acid juice, wherein the inoculated microorganisms reduce the pH of the stable juice to below 4.6 upon elevation of the temperature of the juice to above 40° F.

* * * * *